May 29, 1962 R. A. WILKINS 3,036,369
METHOD OF MAKING FLUID CONDUCTING ELEMENTS
Filed June 29, 1955 12 Sheets-Sheet 1

INVENTOR
RICHARD A. WILKINS
BY Emery Booth Townsend
Miller & Neidner ATT'YS.

May 29, 1962 R. A. WILKINS 3,036,369
METHOD OF MAKING FLUID CONDUCTING ELEMENTS
Filed June 29, 1955 12 Sheets-Sheet 2
FIG.3
FIG.4
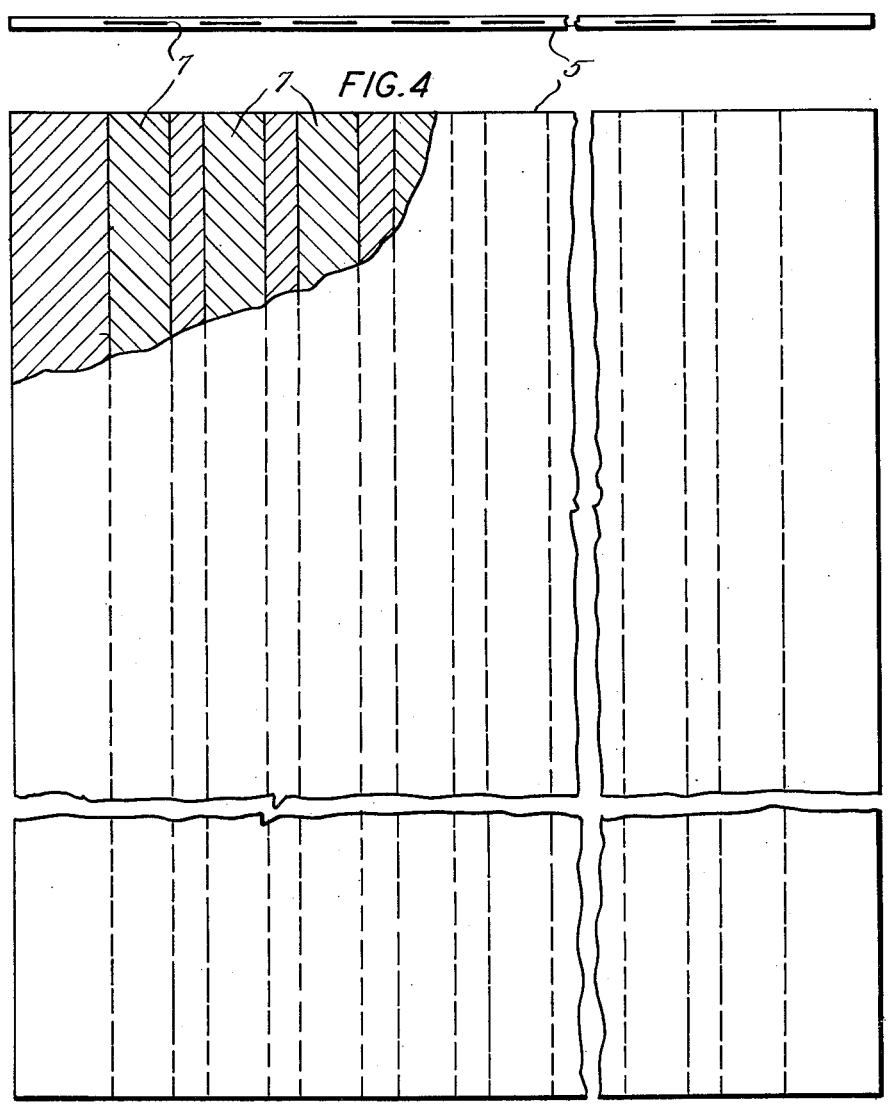
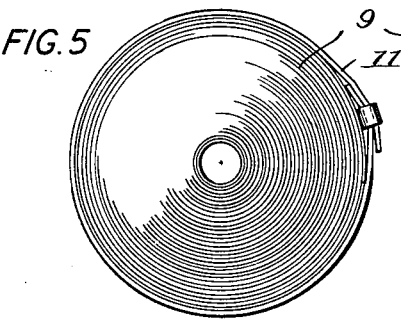
FIG.5
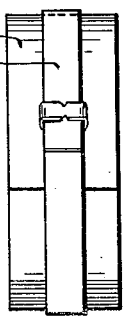
FIG.6
INVENTOR
RICHARD A. WILKINS
BY *Emery Booth Townsend*
*Miller & Widner* ATT'YS.

May 29, 1962 R. A. WILKINS 3,036,369
METHOD OF MAKING FLUID CONDUCTING ELEMENTS
Filed June 29, 1955 12 Sheets-Sheet 3

INVENTOR
RICHARD A. WILKINS
BY *Emery Booth Townsend*
*Miller & Neuder* ATT'YS.

May 29, 1962 R. A. WILKINS 3,036,369
METHOD OF MAKING FLUID CONDUCTING ELEMENTS
Filed June 29, 1955 12 Sheets-Sheet 4
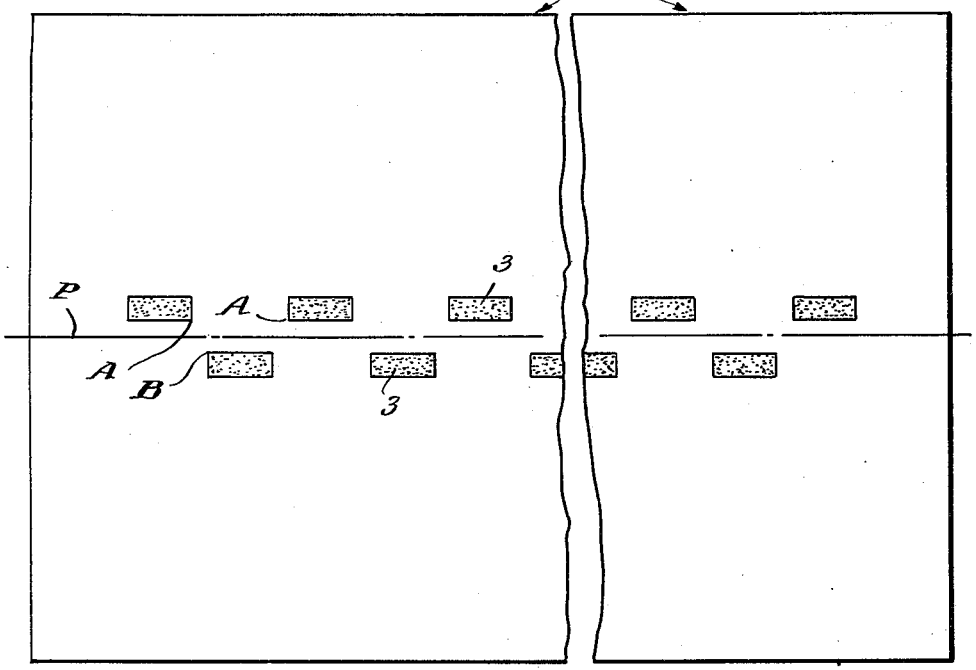
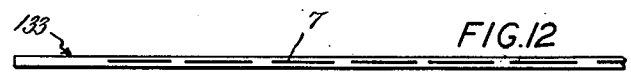
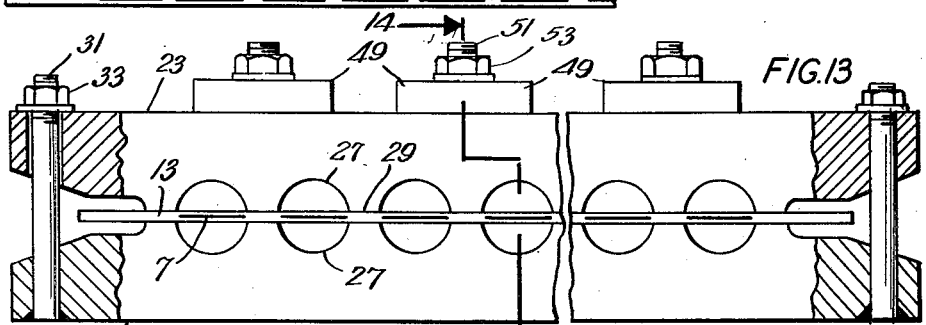
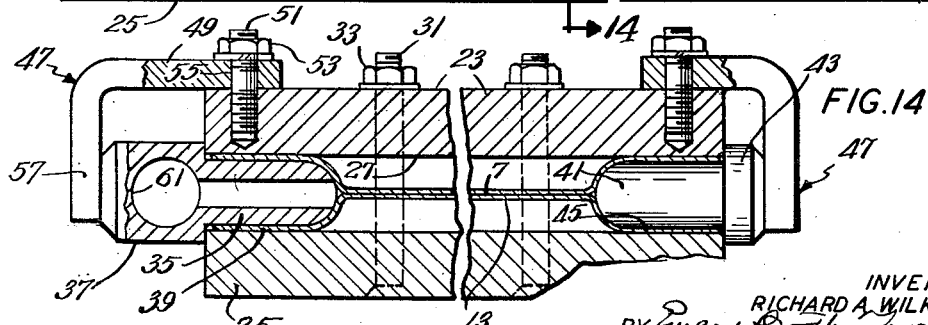
INVENTOR
RICHARD A. WILKINS
BY Emery Booth Townsend
Miller & Wechner ATT'YS.

May 29, 1962 R. A. WILKINS 3,036,369
METHOD OF MAKING FLUID CONDUCTING ELEMENTS
Filed June 29, 1955 12 Sheets-Sheet 5
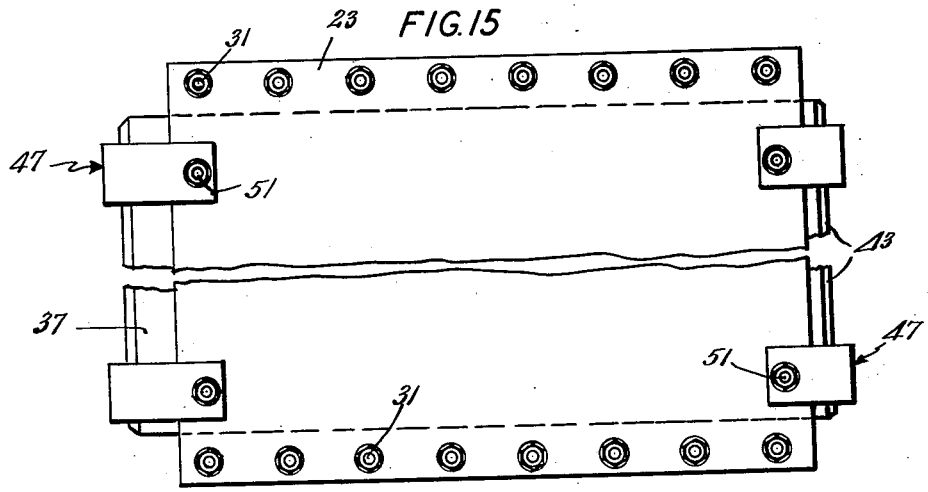
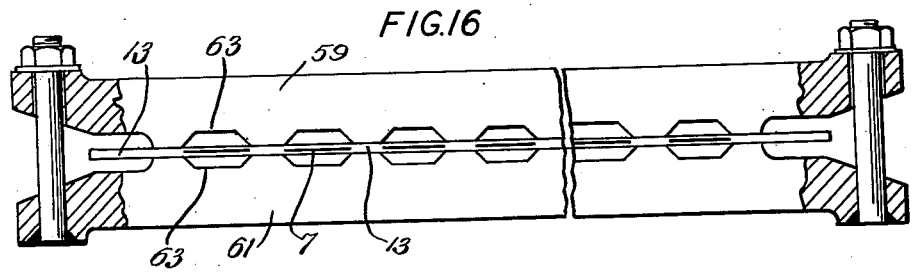
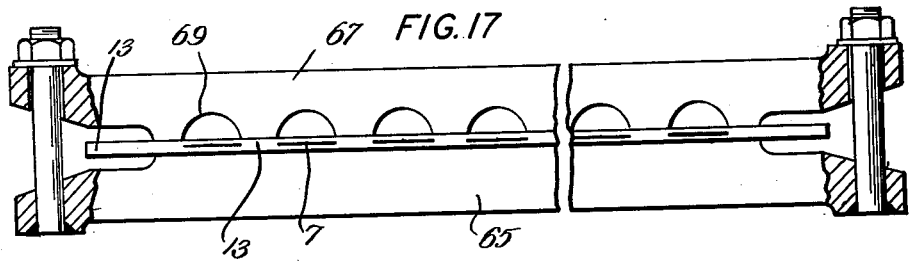
INVENTOR
RICHARD A. WILKINS
BY Emery Booth Townsend
Miller & Neidner ATT'YS.

May 29, 1962 R. A. WILKINS 3,036,369
METHOD OF MAKING FLUID CONDUCTING ELEMENTS
Filed June 29, 1955 12 Sheets-Sheet 6
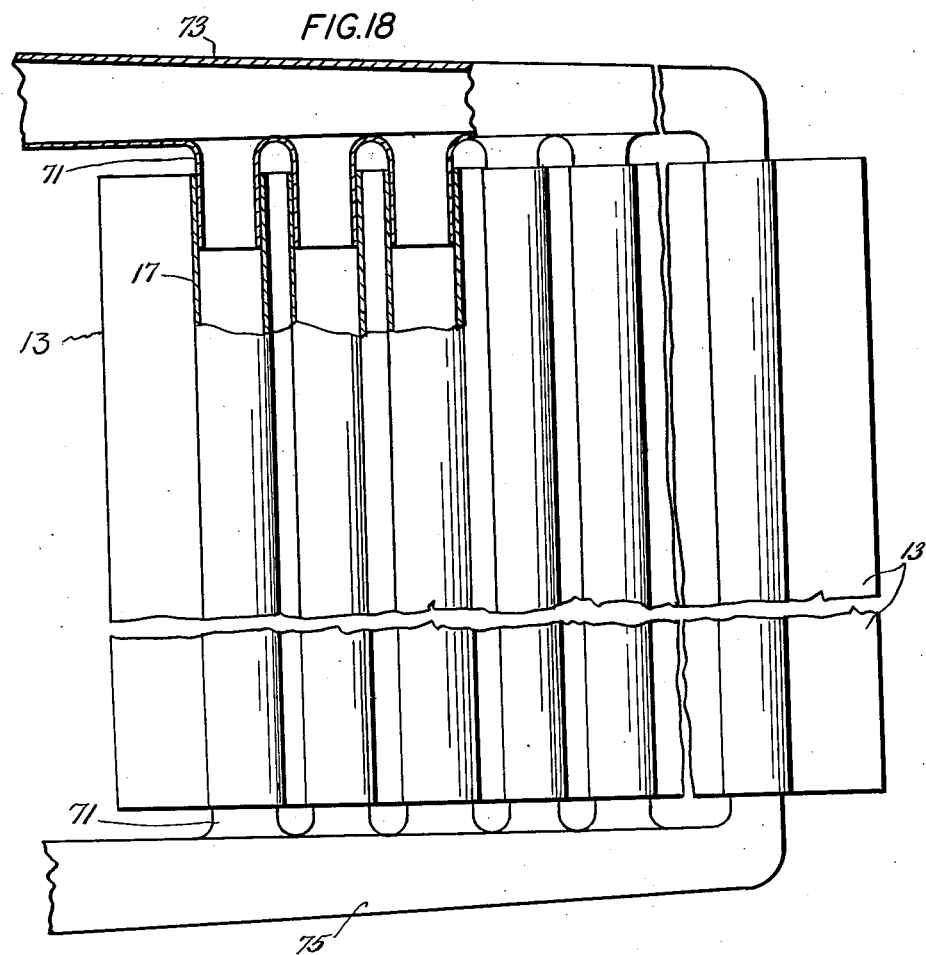
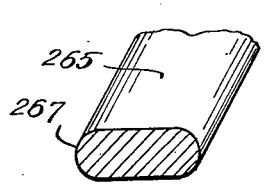
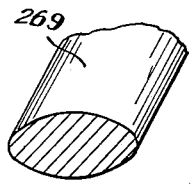
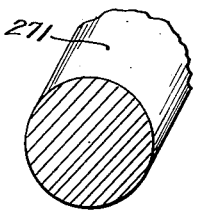
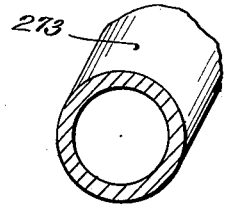
INVENTOR
RICHARD A. WILKINS
BY
ATT'YS.

May 29, 1962 R. A. WILKINS 3,036,369
METHOD OF MAKING FLUID CONDUCTING ELEMENTS
Filed June 29, 1955 12 Sheets-Sheet 7
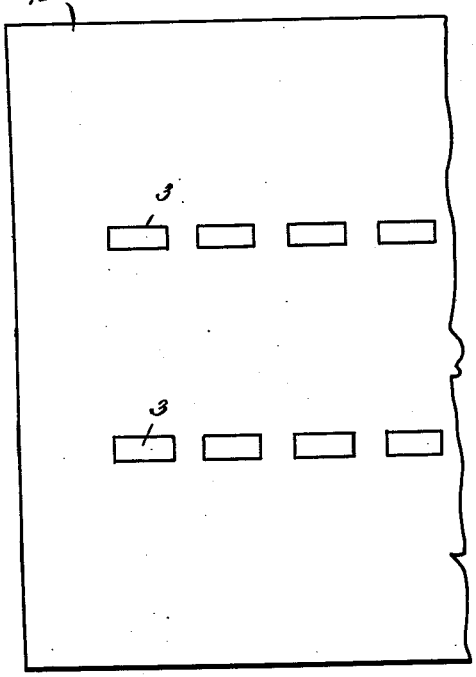
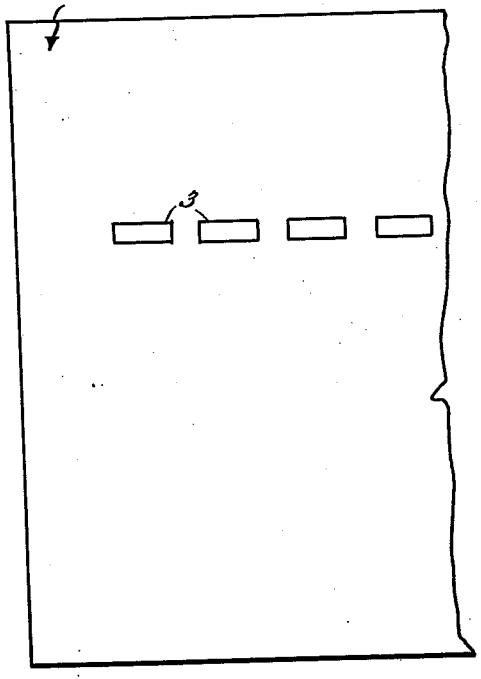
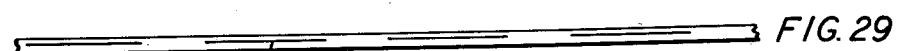
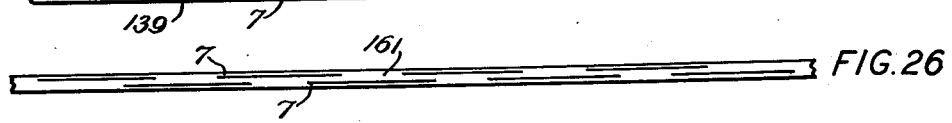
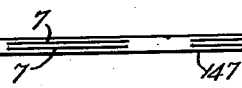
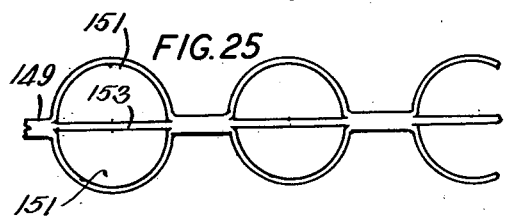
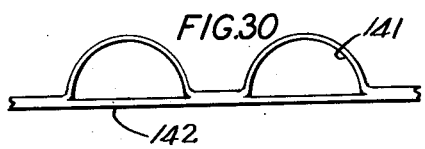
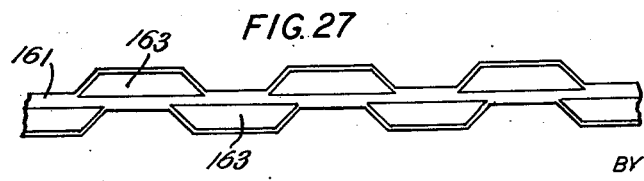
INVENTOR
RICHARD A. WILKINS
BY Emery Booth Townsend
Miller & Weidner ATT'YS.

May 29, 1962     R. A. WILKINS     3,036,369
METHOD OF MAKING FLUID CONDUCTING ELEMENTS
Filed June 29, 1955     12 Sheets-Sheet 8
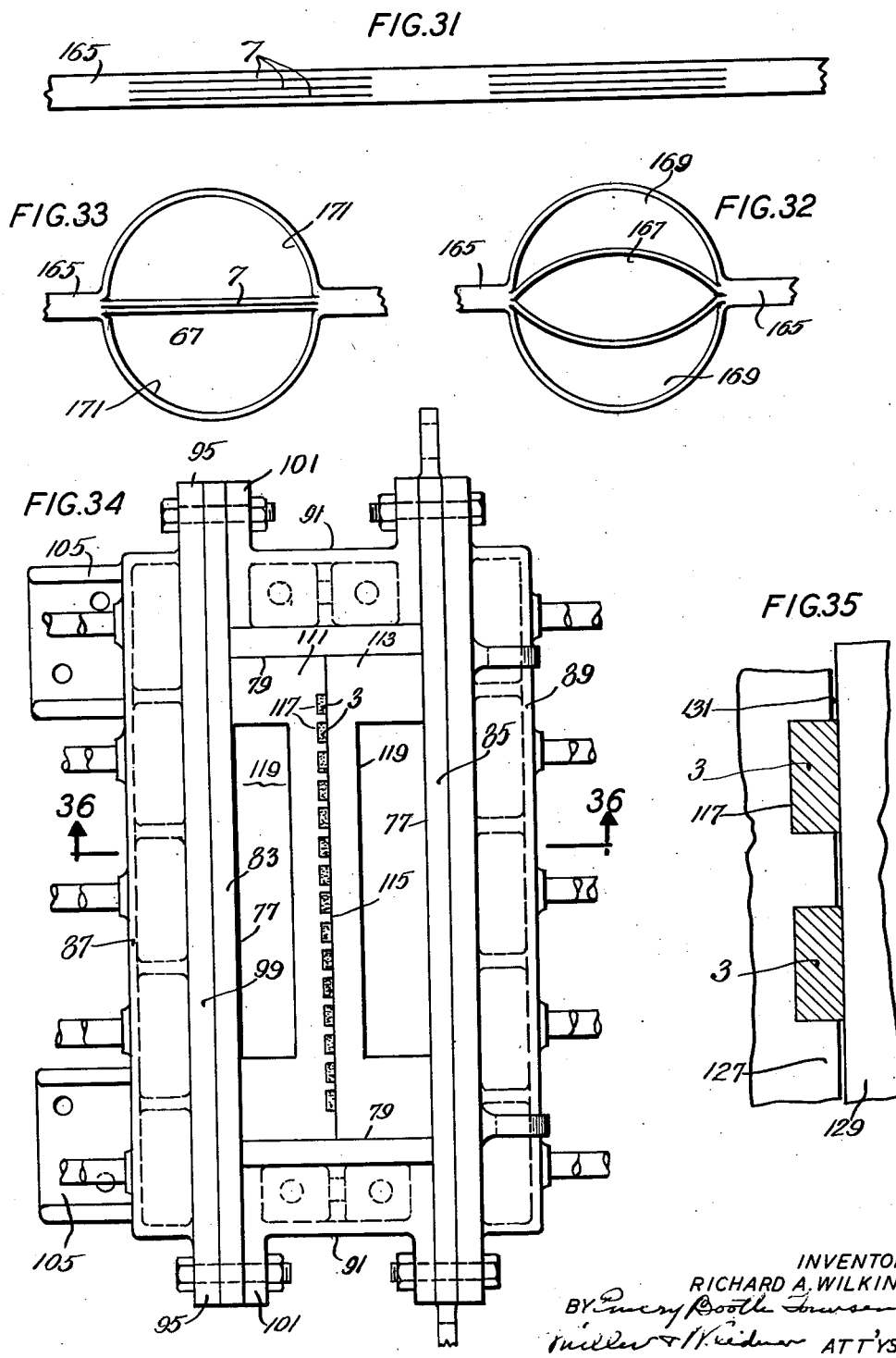
INVENTOR
RICHARD A. WILKINS
ATT'YS.

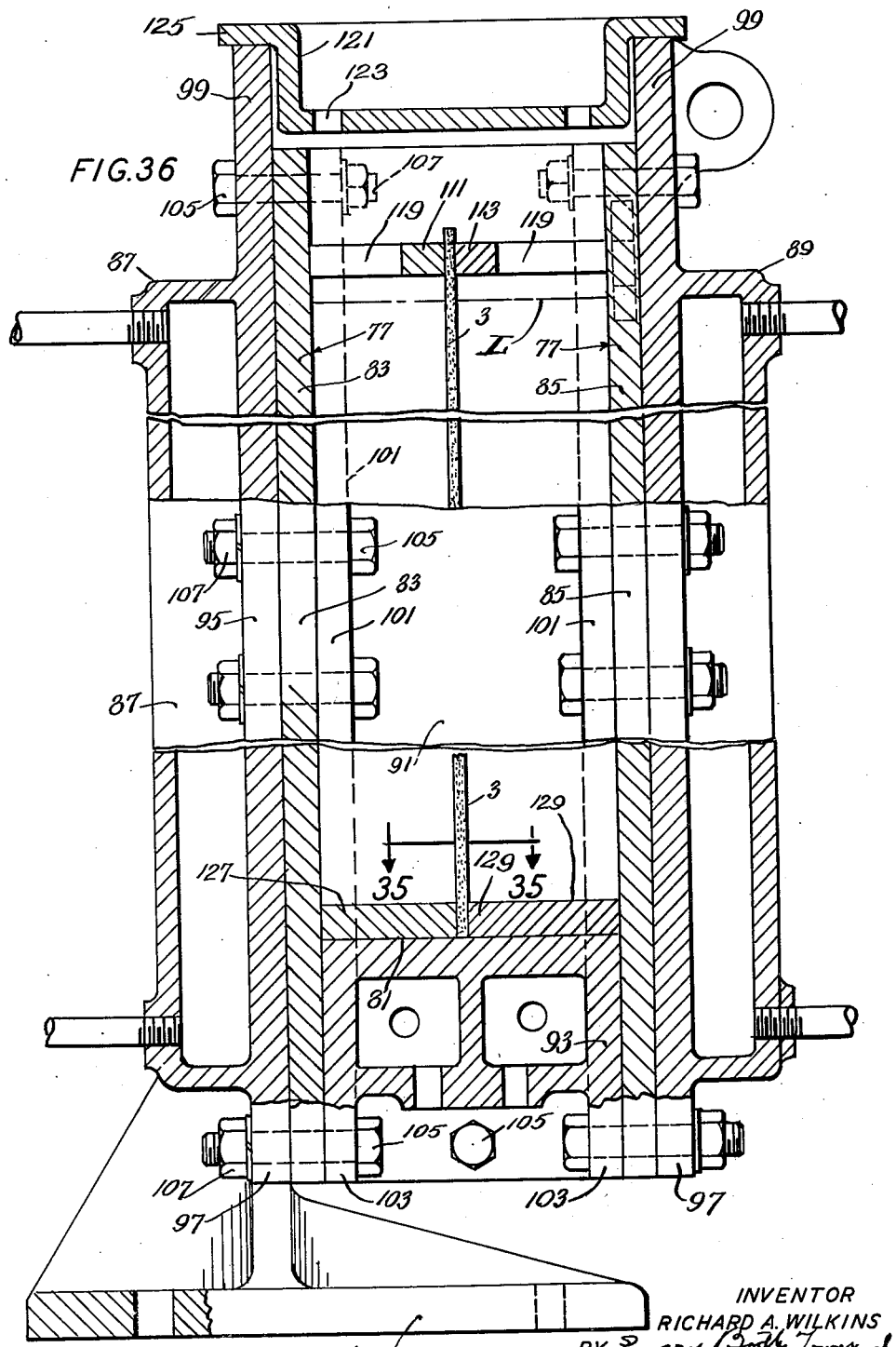

May 29, 1962 R. A. WILKINS 3,036,369
METHOD OF MAKING FLUID CONDUCTING ELEMENTS
Filed June 29, 1955 12 Sheets-Sheet 10

INVENTOR
RICHARD A. WILKINS
BY Emery Booth Townsend
Miller & Neidner ATT'YS.

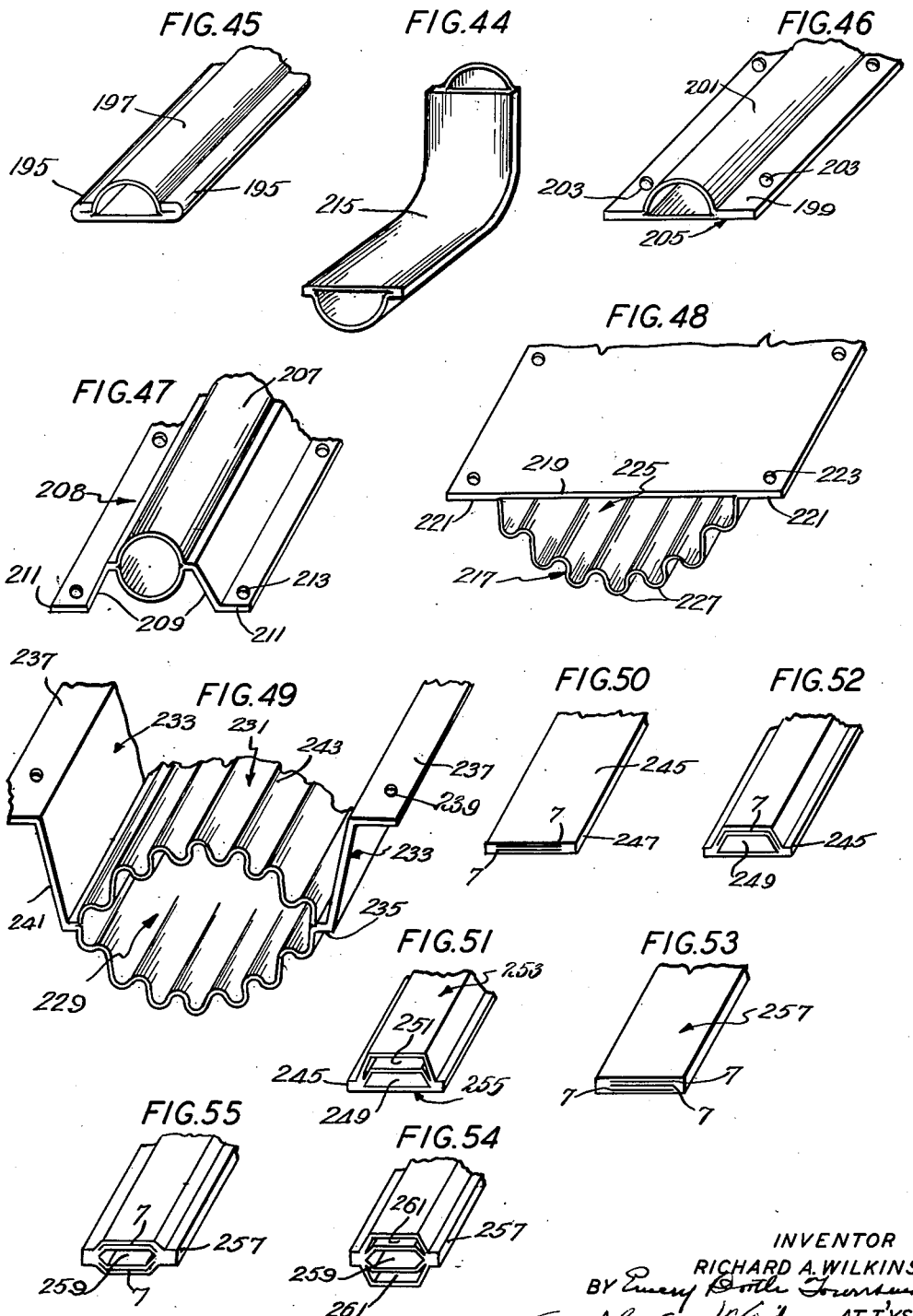

May 29, 1962 R. A. WILKINS 3,036,369
METHOD OF MAKING FLUID CONDUCTING ELEMENTS
Filed June 29, 1955 12 Sheets-Sheet 12
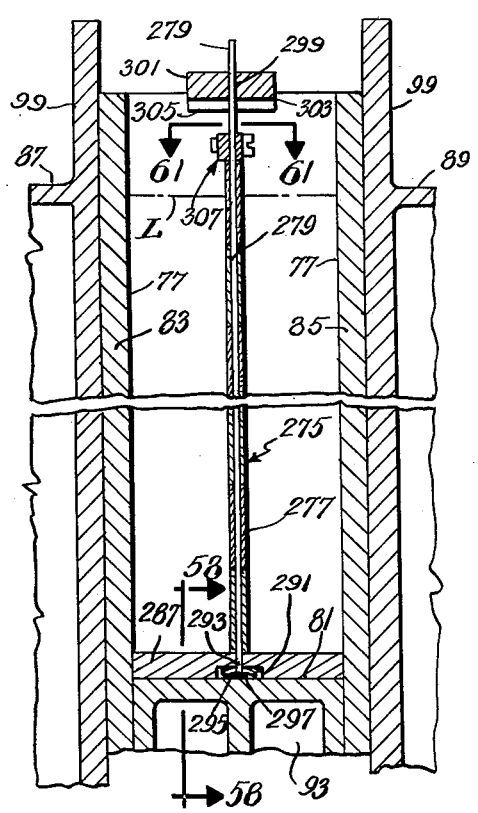
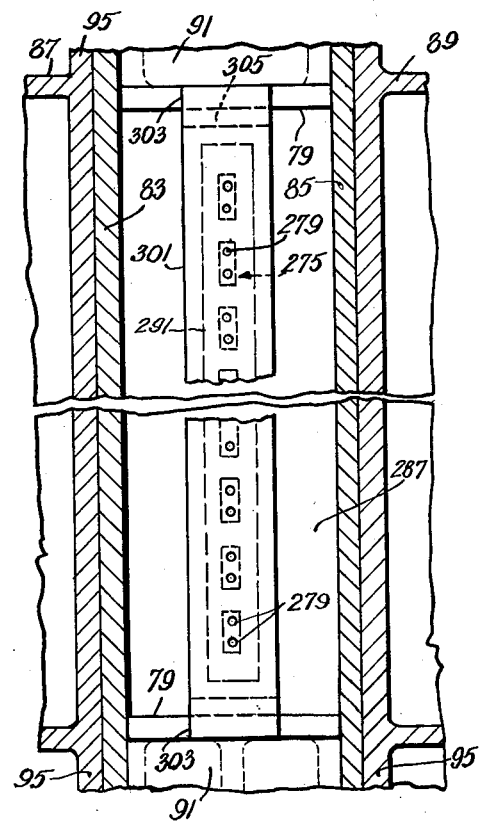
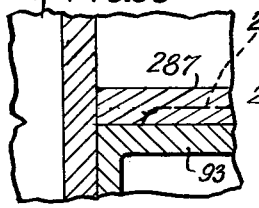
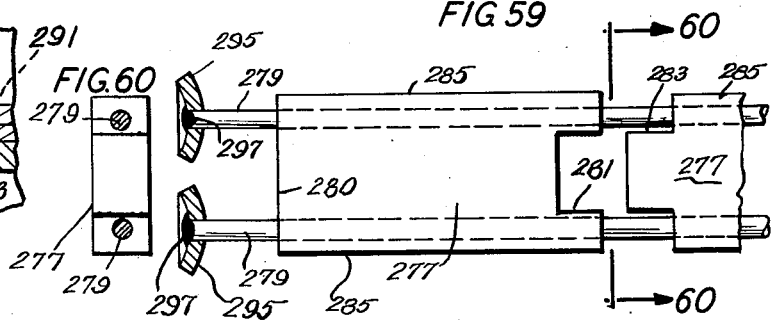
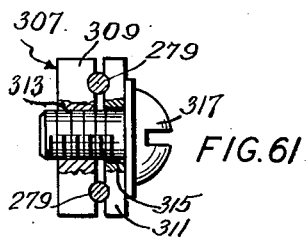
INVENTOR
RICHARD A. WILKINS
BY
ATT'YS.

United States Patent Office 3,036,369
Patented May 29, 1962

3,036,369
METHOD OF MAKING FLUID CONDUCTING ELEMENTS
Richard A. Wilkins, Rome, N.Y., assignor to Revere Copper and Brass Incorporated, Rome, N.Y., a corporation of Maryland
Filed June 29, 1955, Ser. No. 518,768
4 Claims. (Cl. 29—157.3)

My invention relates to tubular fluid conducting elements, materials from which such elements may be produced, and methods of making such elements and materials, this application being a continuation-in-part of my copending application Serial Number 493,169, filed March 9, 1955, now abandoned.

The invention has among its objects the production of rolled cold workable metal bodies particularly, but without limitation thereto, thin gauge strips of great length, which are provided with slits extending throughout their lengths that may be expanded by introduction thereinto of pressure fluid to form tubular passages. By cutting such long strips into suitable shorter lengths and then expanding the slits to form the passages there may be produced, for example, elements suitable for use in refrigerating or other heat exchange apparatus.

The invention has also among its objects the provision of rolled metal bodies, for example strips, of the above character which are free from welds or other bonded joints in the planes of the slits, thus avoiding possibility of the bodies separating in such planes as the slits are being expanded by introduction thereinto of the pressure fluid to form the passages.

A further object of the invention is the production of strips of the above character having lengths comparable to those of ordinary metal strips produced by usual mill practice and at costs comparable to the costs of producing ordinary metal strips. When made in such long lengths the strips according to the invention, like ordinary strips, may be sold and shipped in cylindrical coils by and from the mill to manufacturers of heat exchange elements and the like who may cut the strips into shorter lengths to suit their needs and then expand the slits to form the tubular passages of such elements.

The invention still further has among its objects an improved way of producing seamless tubes, particularly but not exclusively zinc tubes.

The above and other objects of the invention will be best understood from the following description when read in the light of the accompanying drawings, while the scope of the invention will be more particularly pointed out in the appended claims.

According to the invention the metal body having the slits is made by casting a billet or slab of rollable metal about one or more elongated pulverizable members and, without removing said members, rolling the billet for reducing its thickness and, in the direction of the lengths of said members, elongating it, and for flattening the spaces in it occupied by said members to bring opposite sides of said spaces substantially into contact to form the slits, and for crushing said members to fine weld preventing powder and extending such powder along said spaces and slits as the billet is being so elongated. The elongated members, as hereinafter more fully pointed out, may be of various constructions and materials and of various transverse cross-sectional shapes. Hereinafter in this description, for covenience in terminology, and regardless of their constructions and cross-sectional shapes, such members will, where the context permits, be termed "rods."

In the drawings:
FIG. 1 is an end view, and FIG. 2 a side view with parts broken away, of a billet on which a rolling operation may be performed to produce a metal body of the character above referred to;

FIG. 3 is an end view, and FIG. 4 a side view, of a strip according to the invention produced by rolling the billet according to FIGS. 1 and 2;

FIG. 5 is an end view, and FIG. 6 a side view, on a reduced scale, of a cylindrical coil of the strip according to FIGS. 3 and 4;

FIG. 11 is a fragment of an end view of a modified form of billet;

FIG. 12 is an end view of a fragment of a strip which may be formed by rolling the billet according to FIG. 11;

FIG. 13 is an end view of a die or form that may be employed in expanding the slits of the strip according to FIGS. 3 and 4 to produce tubular passages of the cross-section shown by FIG. 8, with parts in section;

FIG. 14 is a section on the line 14—14 of FIG. 13, with parts in elevation;

FIG. 15 is a plan of the die or form according to FIGS. 13 and 14, with parts broken away;

FIG. 16 is an end view of a modified die or form for use in expanding the slits of the strip according to FIGS. 3 and 4 to produce passages of the cross-sectional shape shown by FIG. 10;

FIG. 17 is an end view of a modified die or form for use in expanding the slits of the strip according to FIGS. 3 and 4 to produce passages of the cross-sectional shape shown by FIG. 9;

Figure 1:
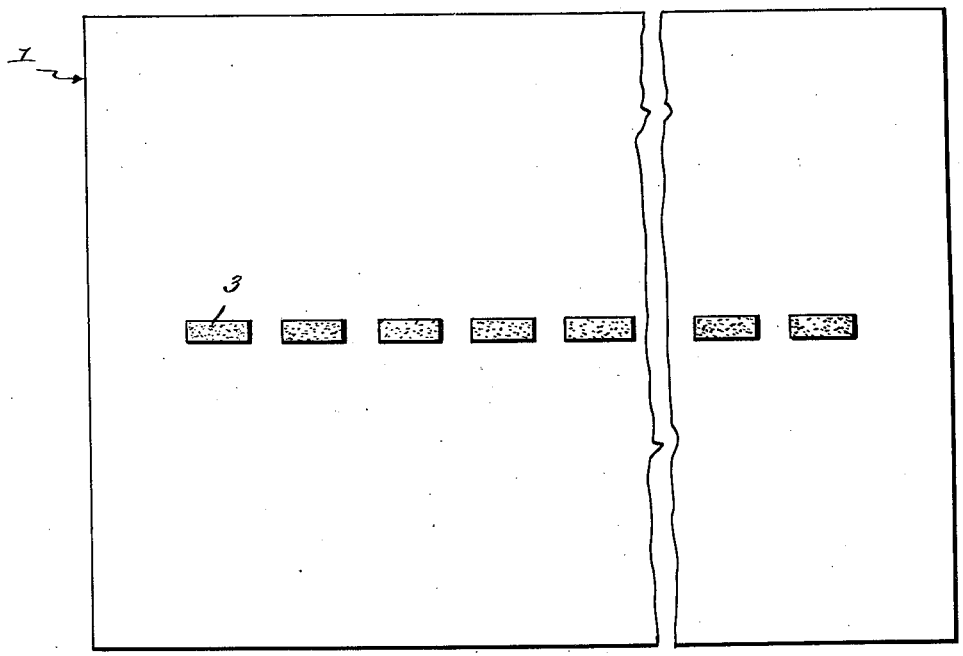
Figure 2:
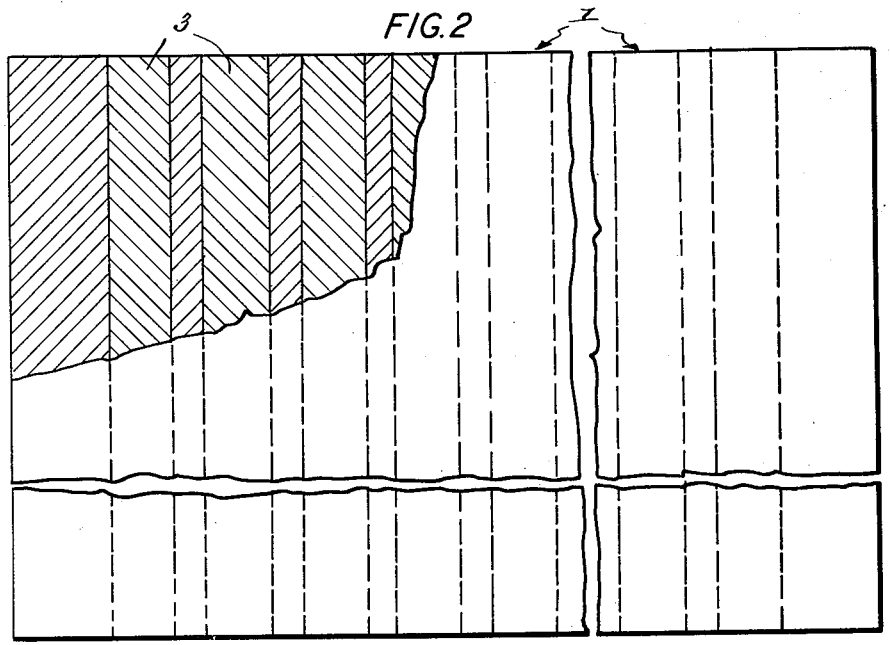
Figure 8:
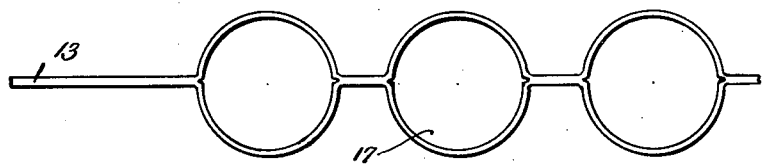
Figure 37:
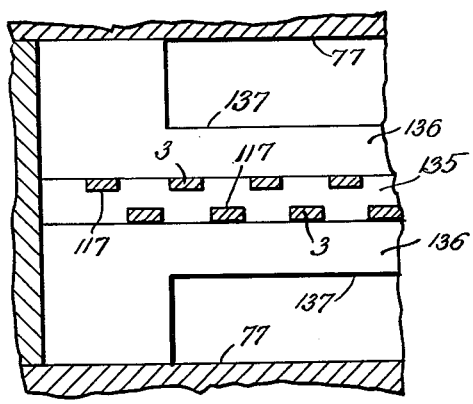
Figure 38:
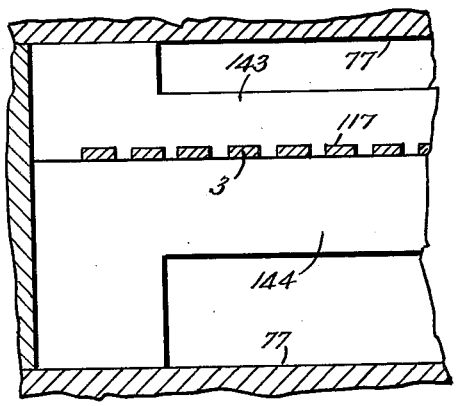
Figure 39:
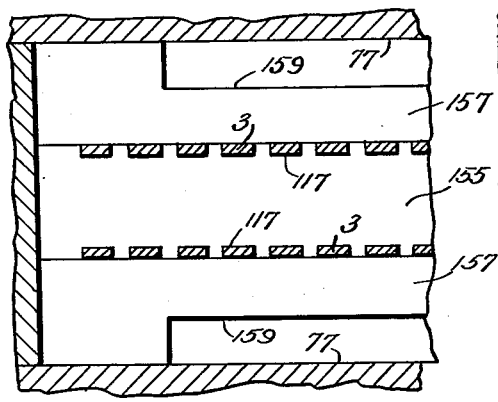
Figure 40:
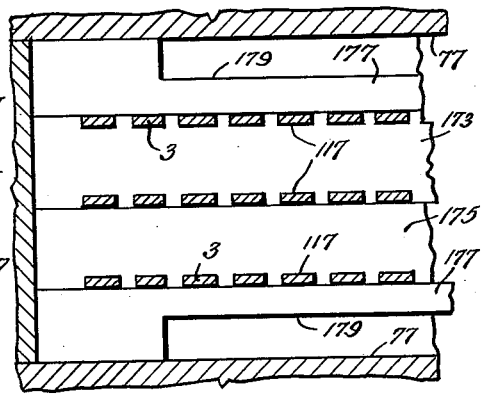
Figure 41:
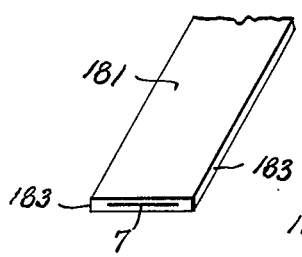
Figure 42:
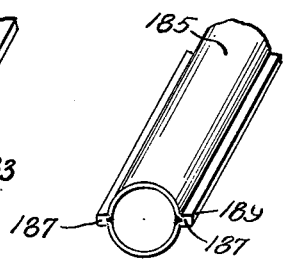
Figure 43:
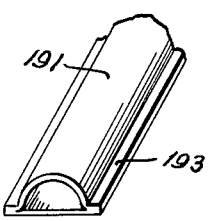

FIG. 18 more or less diagrammatically illustrates an application of a length of the strip according to FIGS. 3 and 4 after the slits of such length are expanded to the cross-sectional shape shown by FIG. 8;

FIGS. 19, 20, 21 and 22 illustrate fragments of modified forms of rods about which the billet otherwise according to FIGS. 1 and 2 may be cast;

FIG. 23 is an end view of a fragment of a modified form of billet according to the invention;

FIG. 24 is an end view of a fragment of a strip which may be produced by rolling the billet according to FIG. 23;

FIG. 25 is an end view of a fragment of an element having tubular passages, illustrating the cross-sectional shape of passages to which the slits of the strip according to FIG. 24 may be expanded;

FIG. 26 is an end view of a fragment of a modification of the strip according to FIG. 24;

FIG. 27 is an end view of a fragment of a tubular element illustrating one form of cross-sectional shape to which the slits of the strip according to FIG. 26 may be expanded;

FIG. 28 is an end view of a fragment of a further modified form of billet according to the invention;

FIG. 29 is an end view of a fragment of a strip which may be produced by rolling the billet according to FIG. 28;

FIG. 30 is an end view of a fragment of a tubular element illustrating the cross-sectional shape of passageways to which the slits of the strip according to FIG. 29 may be expanded;

FIG. 31 is an end view of a fragment of a strip according to the invention provided with three rows of slits;

FIG. 32 shows one form of cross-sectional shape of passageways to which each bank of three slits of the strip according to FIG. 31 may be expanded;

FIG. 33 shows an intermediate step of the operation of expanding the slits of the strip of FIG. 31 to form the passages of the cross-sectional shape shown by FIG. 32;

FIG. 34 is a plan view of a mold for use in producing the billet according to FIGS. 1 and 2, with the pouring box removed;

FIG. 35 is a fragmentary section on the line 35—35 of FIG. 36, on an enlarged scale;

FIG. 36 is a section on the line 36—36 of FIG. 34, with parts in elevation, and on an enlarged scale;

FIG. 37 is a fragmentary plan view illustrating a modified form of the support for the upper end portions of the rods contained in the mold, for substitution for the corresponding support of the mold according to FIGS. 34 and 36, for casting the billet according to FIG. 11;

FIG. 38 is a fragmentary plan view illustrating a modified form of the support for the upper end portions of the rods, for substitution for the corresponding support of the mold according to FIGS. 34 and 36, for casting the billet according to FIG. 28;

FIG. 39 is a fragmentary plan view illustrating a modified form of the support for the upper end portions of the rods, for substitution for the corresponding support of the mold according to FIGS. 34 and 36, for casting the billet according to FIG. 23;

FIG. 40 is a fragmentary plan view illustrating a modified form of the support for the upper end portions of the rods, for substitution for the corresponding support of the mold according to FIGS. 34 and 36, for casting the billet from which the strip according to FIG. 31 may be rolled;

FIG. 41 is an isometric view of a fragment of a strip according to the invention having a single slit;

FIGS. 42 and 43 are isometric views showing two forms of tube which may be produced by expanding the slit of the strip according to FIG. 41;

FIG. 44 is an isometric view of a tube, having the cross-sectional shape shown by FIG. 43, which may be formed by transversely bending the strip according to FIG. 41 and expanding the bent strip while in a die or form;

FIG. 45 is an isometric view of a modification of the tube according to FIG. 43;

FIG. 46 is an isometric view of a further modification of the tube according to FIG. 43;

FIG. 47 is an isometric view of a modification of the tube according to FIG. 42;

FIG. 48 is an isometric view of one form of tube according to the invention in which the arcuate wall of the tube is formed with stiffening corrugations;

FIG. 49 is an isometric view of another form of tube according to the invention in which the arcuate walls of the tube are formed with stiffening corrugations;

FIG. 50 is an isometric view of a further form of strip according to the invention having a single pair of opposite slits;

FIG. 51 is an isometric view of one form of tube which may be produced by expanding the slits of the strip according to FIG. 50;

FIG. 52 is an isometric view illustrating an intermediate step of the method of forming the tube according to FIG. 51 from the strip according to FIG. 50;

FIG. 53 is an isometric view of a strip according to the invention having three opposite slits;

FIG. 54 is an isometric view of one form of tube which may be produced by expanding the slits of the strip according to FIG. 53;

FIG. 55 is an isometric view illustrating an intermediate step of the method of forming the tube according to FIG. 54 from the strip according to FIG. 53;

FIG. 56 corresponds to a fragment of FIG. 36 on a reduced scale, and shows a mold having a modified form of the rods and their supports;

FIG. 57 is a plan of the fragment of the mold according to FIG. 56, and corresponds to a fragment of the mold according to FIG. 34 having the modified rods according to FIG. 56;

FIG. 58 is a section on the line 58—58 of FIG. 56 showing a detail, with parts omitted;

FIG. 59 is a side elevation of a fragment of one of the rods according to FIGS. 56 and 57, with parts in exploded relation to other parts;

FIG. 60 is a section on the line 60—60 of FIG. 59; and

FIG. 61 is a section on the line 61—61 of FIG. 56 on an enlarged scale, showing a detail.

It is believed that the invention will be best understood by first describing one example of a specific embodiment thereof. According to such example, a thick cast billet or slab 1 (FIGS. 1 and 2) of phosphorus deoxidized copper, 5 inches thick, 12½ inches wide and 5 feet long, which will weigh about 1,200 pounds, is cast about a row of fifteen graphite rods 3 of rectangular cross-section each ½ inch wide and ⅜₆ inch thick, the rods being spaced ¼ inch apart and extending lengthwise of the billet from one end thereof to the other with the edges of the rods adjacent the billet side edges being spaced ¾ inch therefrom, and the widthwise medial planes of the rods lying in the widthwise medial plane of the billet.

After producing the above described billet it is passed in the direction of the lengths of the rods 3 between the rolls of a rolling mill to produce the strip 5 (FIGS. 3 and 4), of small gauge, say one which is 0.025 inch thick. Such rolling, it will be understood, will not materially affect the widthwise dimensions of the billet so that the strip 5 will be approximately of the same width as the billet, that is to say, 12½ inches wide, but as the volume of the metal of the strip is approximately the same as that of the metal of the billet and the billet when rolled from 5 inches to 0.025 inch thick is reduced in thickness about 200 times the strip 5 will be about 1,000 feet long. Were the billet reduced to 0.007 inch gauge, which for some uses of the strip is desirable, the strip would be over ⅔ of a mile long. The rolling operation will flatten the spaces occupied by the graphite rods and crush such rods to a fine weld preventing powder of small particle size. Because such powder is confined to these spaces it will be spread or otherwise extended along them continuously as they are flattened. The flattening of the spaces takes place at a greater rate than the thinning of the billet, so that long before the billet is reduced to its final thickness opposite sides of the spaces will be brought practically into contact with an extremely thin and attenuated layer of the weld preventing powder between them, sufficient of this powder being present throughout the entire rolling operation to prevent any welding together of such substantially contacting sides. In the strip 5 such flattening of the spaces occupied by the graphite rods will cause the strip to be formed in this example with a row of fifteen parallel slits 7 extending throughout the length of the strip and lying in the widthwise medial plane of the strip, these slits being of approximately the same width as the original rods of the billet and spaced the same distance apart as those rods. As viewed in a section cut transversely of the strip, the slits appear as very thin black lines, this color being due to the thin layer of graphite between the faces of the slits.

The rolling operation in the above example may be performed in accordance with usual mill practice in producing thin gauge strip copper of the desired temper, such practice comprising first hot rolling the billet, then pickling it to remove the scale, and completing the reduction by cold rolling. In about ten passes the hot billet according to the above example will be reduced in thickness to about ¼ inch, at which point will be secured slits of the same characteristic appearance as those in the final strip, when viewed in a section cut transversely of the strip, except that in the ¼ inch thick strip the black lines indicating the slits will be considerably heavier. As the graphite powder is not malleable like the copper, the thicknesses of the spaces occupied by the rods tend to be reduced faster than the thicknesses of the bodies of graphite powder in such spaces, and particularly during the first part of the hot rolling operation. Hence an excess of the powder during the first several hot rolling passes will be squeezed from those ends of the spaces which are advancing toward the rolls. No such discharge of the powder can ordinarily be observed after the thickness of the billet in this example is reduced to about ¼ inch.

The strip produced in the above way may be coiled flatwise, in accordance with usual mill practice in producing strip material, to form cylindrical multiturn coils 9 (FIG. 5) provided with removable bands or other ties 11 for holding the turns together, which coils may be shipped to the users of the strips and from which may be cut pieces of convenient lengths to suit the user's needs in producing desired articles from such lengths. When necessary the strips produced by the rolling operation may be cut into lengths for producing coils of the desired weights, as such coils are usually sold in weights specified by the purchaser.

Figure 7:
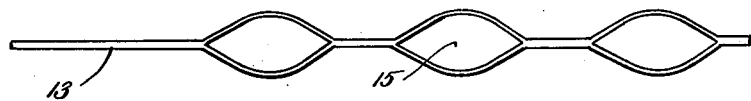
FIGS. 7, 8, 9 and 10 illustrate, on an enlarged scale, various cross-sectional shapes of tubular passages that may be formed by expanding the slits of the strip according to FIGS. 3 and 4 by introduction of pressure fluid into such slits.

The slits 7 of lengths 13 cut from the strip 5 may be blown up or expanded by pressure fluid introduced between their opposite sides to form fluid conducting or other passages 15 of the cross-sectional shapes shown by FIG. 7, the exact cross-sectional shape being determined by controlling the degree of pressure of such fluid and the maximum expansion obtainable obviously being that which will cause the passage to be of circular cross-section. Expanding the slits in this way makes the widths of the passages somewhat narrower than the widths of the slits. By use of suitable dies or forms for controlling the cross-sectional shapes of the passages the metal at opposite sides of the slits may be stretched to produce passages of various cross-sectional shapes, such as exemplified by the passages 17 of FIG. 8, passages 19 of FIG. 9, and passages 21 of FIG. 10, and without making the widths of the passages narrower than those of the slits.

Conveniently in expanding the slits of the lengths 13 of strip in either of the above described ways pressure fluid may be introduced into one end of each slit by inserting in such end a blunt pointed nozzle provided with a clamp for securing it to the strip, while the other end of the slit may be pinched by use of a suitable clamp to hold it closed while pressure fluid is being introduced into the slit through the nozzle to expand the metal between the latter and the clamp at the opposite end of the slit, whereupon the end portion of the strip in which the nozzles were inserted and the opposite end portion of the strip may be trimmed off.

When it is desired to avoid the waste of material involved in trimming off the ends of the lengths 13 of strip after the slits have been expanded as above described, and the passages formed by expanding the slits are to be of circular cross-section as shown in FIG. 8, the die or form shown by FIGS. 13, 14 and 15 may be employed. This die comprises the thick rigid metal plates 23 and 25 having opposite faces in which are formed registering longitudinally extending spaced parallel groove-like recesses 27 of approximately semi-circular cross-section, the metal at opposite sides of these recesses forming longitudinally extending ribs 29 which contact the opposite faces of the length of strip when positioned between said plates. The holes of circular cross-section formed by the pairs of registering recesses 27 have diameters approximately those of the widths of the slits 7, which slits when the length of strip is placed between the plates extend diametrically across said holes from one side thereof to the other. The plates after the length of strip is placed between them may be clamped together and against said length by use of the row of bolts 31 and nuts 33 cooperating with said bolts. After the length of strip is so clamped between the plates the faces of the slits 7 at each of opposite end portions thereof may then be somewhat spread apart by inserting between said faces a suitable knife-edged chisel-like tool. Into such spread apart portions of the slits at one end thereof may be forced nipples 35 forming part of a pressure fluid conducting manifold 37, such insertion of the nipples stretched the metal at opposite sides of the slits at such portions to fill the portions of the recesses 27 thereat as indicated at 39 (FIG. 14). In a similar way plugs 41 carried by a longitudinally extending bar 43 may be forced into the spread apart portions of the slits at their opposite ends also to stretch the metal at opposite sides of the slits at said portions to fill the recesses 27 thereat as indicated at 45. Pressure fluid may then be admitted to the manifold to stretch the metal at opposite sides of those portions of the slits which lie between the nipples and plugs so as to form the complete passages 17 of FIG. 8.

For preventing the pressure fluid from forcing the nipples 35 and plugs 41 from the recesses 27 when pressure fluid is admitted to the manifold for expanding the slits, there may be provided L-shaped members 47 having horizontal legs 49 detachably secured to the plate 23 by stud bolts 51 and cooperating nuts 53, the stud bolts being permanently carried by the plate 23 and extending through perforations 55 formed in said legs. The L-shaped members also have vertical legs 57 which bear against the outer side of the manifold 37 and outer side of the bar 43 carrying the plugs 41.

Figure 10:
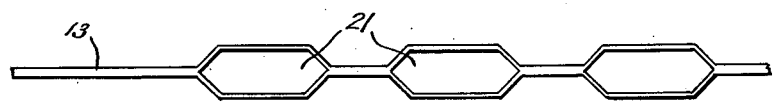

The slits 7 of the lengths 13 cut from the strip 5 may be expanded to the cross-sectional shapes of the passages 21 of FIG. 10 by use of the modified die or form shown by FIG. 16, which modified die is identical with that above described except that the upper plate 59 and lower plate 61 are formed with longitudinally extending recesses 63 of shape complementary to the upper and lower halves of the exterior walls of the passages 21.

Figure 9:

Similarly the slits 7 of the lengths 13 cut from the strip 5 may be expanded to the cross-sectional shapes of the passages 19 of FIG. 9 by use of the modified die or form shown by FIG. 17, which modified die is identical with that shown by FIGS. 13, 14 and 15 except that the lower plate 65 (FIG. 17) presents an upper entirely flat face to the length 13 of strip, while the opposed face of the upper plate 67 is formed with longitudinally extending parallel recesses 69 each of which is of cross-section complementary to that of the upper side of the passage 19 of FIG. 9.

The above described lengths 13 of strip after the slits 7 thereof are expanded to form tubular passages may be employed for various purposes. For example, a heat exchange element for use in refrigerators or the like may be formed of the length having for example the cylindrical passages 17 of FIG. 8 by inserting into the opposite end portions of said passages the nipples 71 (FIG. 18) of manifolds 73 and 75 and soldering or brazing such nipples in place. One of these manifolds may serve as an inlet connection to these passages and the other as an outlet connection therefrom, so that refrigerant or fluid to be refrigerated may be passed through said passages in parallel. Similarly, and in an obvious manner, by use of suitable return bends at each end of the strip, the end portions of the legs of which bends form nipples that are inserted in the end portions of the adjacent passages and soldered in place, said passages may be connected for series flow of fluid through them. Likewise strips in which the slits are expanded to the cross-sectional shapes shown by FIGS. 7, 9 and 10 may be connected for either parallel or series flow through the passages by employing manifolds or return bends having nipples of the cross-sectional shapes of said passages, or, if nipples of circular cross-section are employed, the end portions of such passages may be expanded by use of a suitable tool driven into them to a circular cross-section for receiving such nipples.

The billet according to FIGS. 1 and 2 may be cast by use of a mold with the graphite rods appropriately carried in the mold chamber properly to position them in the billet. The mold may be of the vertical Junkers type such as shown by P. M. Mueller U.S. Patent 2,310,805, issued February 9, 1943, or there may be employed for the purpose the vertical mold shown by FIGS. 34, 35 and 36.

The mold of FIGS. 34, 35 and 36 comprises a vertical open top mold chamber having the opposite side wall surfaces 77, opposite edge wall surfaces 79, and bottom wall surface 81. The two side wall surfaces 77 are formed by the inner sides of plates 83 and 85, respectively. At the outer side of the plate 83 and bearing against such side is a hollow water cooled casting 87, and at the outer side of the plate 85 and bearing against that side is a like hollow water cooled casting 89. The two edge wall surfaces 79 of the mold chamber are formed by the inner surfaces of elongated hollow water cooled castings 91 positioned between the plates 83 and 85, against the opposite vertical edges of which castings said plates bear. The bottom wall surface 81 of the mold chamber is formed by the upper surface of a hollow water cooled casting 93 against the vertical outer sides of which bear the inner sides of the plates 83 and 85 and the inner sides of the castings 91 defining the edges of the mold chamber.

The water cooled castings 87 and 89 of the mold are shown as provided along each of their vertical side edges with longitudinally extending outwardly projecting flanges 95, and along their lower horizontal side edges with longitudinally extending downwardly projecting flanges 97, and along their upper horizontal side edges with longitudinally extending upwardly projecting flanges 99, these flanges 95, 97 and 99 of each casting as a group extending continuously about the edge of that casting. Opposite the flanges 95 the vertical edge castings 91 of the mold are provided with outwardly extending flanges 101, while opposite each of the downwardly projecting flanges 97 the bottom mold casting 93 is provided with a downwardly projecting flange 103. The vertical edge portions of the plates 83 and 85 are positioned between the pairs of flanges 95 and 101 and the horizontal edge portions of said plates between the pairs of flanges 97 and 103, and extending through these flanges and edge portions are rows of bolts 105 having the removable nut 107. In this way the casting 89 and adjacent plate 85 may be removed from the rest of the mold to permit removal of the billet and afterward replaced.

As shown, the casting 87 at the left hand side of the mold, as viewed in FIG. 36, is provided at its lower end with feet 109 which may rest upon and be secured to a foundation pier for holding the mold in vertical position.

For casting the billet according to FIGS. 1 and 3 the graphite rods 3, as shown by FIGS. 34 and 36, are arranged in a row along the widthwise medial plane of the mold chamber and extend upwardly from the bottom of said chamber to above the upper level L of the body of metal poured into that chamber. As shown, the upper end portions of the rods are supported by a pair of horizontal plates 111 and 113 of heat refractory material, preferably graphite, which abut each other along a vertical plane represented by the line 115 (FIG. 34) coinciding with the right hand faces of the rods as viewed in FIG. 34. The edge of the plate 111 which so abuts the plate 113 as shown is formed with a series of notches 117 which receive the rods, these notches in conjunction with the adjacent edge of the plate 113 forming openings through which the rods slidably extend to take care of linear expansion of the rods. The plates 111 and 113 intermediate their ends are cut away at their outer edges to form longitudinally extending notches or openings 119 through which metal may be poured into the mold chamber through its top opening. Preferably a pouring box 121 (FIG. 36) having a row of openings 123 in its bottom wall, is provided for directing into the notches 119 the molten metal poured into said box from the ladle. As shown, this pouring box is provided with opposite edge flanges 125 which rest upon the upper edges of the flanges 99 of the mold as viewed in FIG. 36.

The lower end portions of the rods 3 are shown as supported in the mold chamber by a pair of plates 127 and 129, also of heat refractory material preferably graphite, and identical with the graphite plates 111 and 113 at the upper portion of the mold, except that the notches 119 of the plates 111 and 113 are omitted in the plates 127 and 129 to cause the upper surfaces of the plates 127 and 129 to define the lower surface of the billet, and except that a small clearance indicated at 131 (FIG. 35) is provided between the adjacent edges of the plates 127 and 129 for causing the edge of the plate 129 to clamp against the adjacent faces of the rods for fixedly securing them in the notches 117 in the plate 127. By so clamping the lower ends of the rods the rods are prevented from floating upward due to their buoyancy in the molten metal.

The plates and rods may be assembled in the mold after removal of the water jacketed mold casting 89 and adjacent plate 85 of the mold. The parts are so designed that when the plate 85 and casting 89 are again placed in position and bolted in place the adjacent edges of the rod supporting plates 111 and 113 at the upper portion of the mold chamber will be forced into contact, while the rod supporting plate 129 at the bottom of the mold chamber will be forced against the rods 3, and at the same time the pair of plates 111 and 113 and other pair of plates 127 and 129 will be firmly clamped between the mold plates 83 and 85 in this way to clamp the pairs of cooperating plates of the rod supports firmly against movement relative to the walls of the mold chamber. While the rods and their supporting plates are being assembled in the mold chamber the plates 111 and 113 at the upper portion of that chamber may be supported in any suitable manner, for example, by resting them upon the upper ends of vertically positioned wooden strips or narrow boards resting at their lower ends upon the plates 127 and 129 at the bottom of the mold chamber. After the mold is closed these strips or boards may be removed through the notches 119 in the upper plates.

When it is desired to form a strip such as the strip 133 (FIG. 12) having the slits 7 placed edgewise close together, say for example but without limitation thereto ⅛ inch, there is lack of assurance if the rods in the billet are placed with their widthwise medial planes in alignment that the metal when being cast to form the billet will properly fill the spaces between the rods at all points lengthwise thereof, and lack of assurance that the rolling operation will not cause the material of one rod to break through the metal into the space occupied by the adjacent rod, or such metal between adjacent rods otherwise to fail, and place adjacent slits in communication. Such assurance however may be had by so placing alternate rods in the mold that in the billet they will lie close to and at opposite sides of the medial or other widthwise plane P (FIG. 11) of the billet 134 so as initially to provide an increased amount of metal between the adjacent corners A and B of adjacent rods. When the billet is rolled to reduce its thickness the slits 7 resulting from the presence of the rods, if the billet is thick compared to the amount of reduction in its thickness, will be moved approximately and for all practical purposes into the medial or other widthwise plane of the strip produced as illustrated in FIG. 12. For example, if the billet is initially 5 inches thick and is reduced in thickness to 0.025 inch by the rolling operation, all dimensions in the direction of the thickness of the billet will be reduced two hundred times, so that if the rods, for example, are 0.1 inch thick, and are spaced with the widthwise medial planes of adjacent rods 0.26 inch apart, such 0.26 inch dimension will be decreased to about 0.0013 inch, in other words, all the slits 7 of the strip produced will lie approximately in the same plane.

For casting the billet according to FIG. 11 the mold according to FIGS. 34 to 36 may be employed. The upper portions of the rods 3 may be supported by a composite plate of heat refractory material, preferably graphite, comprising the central strip 135 (FIG. 37) and two outer strips 136, the notches 117 for slidably receiving the upper portions of the rods being formed in the opposite longitudinally extending edges of the strip 135, which notches are closed by the adjacent edges of the strips 136. As shown, the strips 136 along their outer edges are formed with longitudinally extending notches 137 which in conjunction with the adjacent sides 77 of the mold chamber form openings through which the molten metal may pass from above into the portion of the mold chamber below the strips. The portions of the rods 3 at the bottom of the mold may be supported by like strips, except that the notches 137 in the strips 136 will be omitted and there will be a slight clearance, like the clearance 131 of FIG. 35, between the abutting edges of the strips so that the edges of the strips 136 at the bottom of the mold chamber will clamp against the adjacent sides of the rods.

The row of rods 3 may be placed much closer to one face than to the other of the billet, as indicated in the billet 138 according to FIG. 28. This will cause the slits 7 in the rolled product to lie correspondingly closer to one face of such product than to its opposite face, as indicated in the strip 139 (FIG. 29). For example, if the billet according to FIG. 28 is 5 inches thick and the rods are placed with their widthwise medial planes 1⅔ inches from the upper face 140 of the billet as viewed in that figure and 3.33 inches from the opposite lower face, and a strip rolled from the billet lengthwise of the rods is 0.45 inch thick, the slits in that strip will be about 0.15 inch from the upper face of the strip and 0.30 inch from the lower face of the strip as viewed in FIG. 29. The slits of the strip according to FIG. 29 may be expanded by introduction of pressure fluid thereinto to form the passages 141 of the cross-section indicated in FIG. 30, of which passages the flat bottom walls 142 thereof will be thicker than the curved opposite walls thereof, corresponding to the spacing of the slits from the opposite faces of the strip.

In casting the billet according to FIG. 28 the mold illustrated by FIGS. 34 to 36 may be employed, the rods being positioned closer to one surface 77 of the mold chamber than to its opposite surface 77. The rods may be supported in a manner similar to that shown in FIGS. 34 to 36, namely, by plates 143 and 144 (FIG. 38) at the top of the mold identical with the plates 111 and 113 of FIGS. 34 to 36 except that, as shown by FIG. 38, the plate 144 is wider than the opposite plate 143. At the bottom of the mold the rods may be supported by plates identical with the plates 127 and 129 of FIGS. 35 and 36 except that one plate will be wider than the other, like the plates 143 and 144, to accommodate the changed position of the rods.

It will be understood that more than one row of graphite rods 3 may be employed, for example two rows, as shown in the billet 145 in FIG. 23. This billet may be rolled to produce the strip 147 (FIG. 24) having a plurality of banks of opposite slits 7, each bank consisting of two slits. The slits of the strip according to FIG. 24 may be expanded to produce, among others, the element 149 having the pairs of opposite passages 151 each of semi-circular cross-section having a flat wall 153 separating them. These passages may be formed by placing the strip in the die or form according to FIGS. 13 to 15 and introducing into each slit of each bank of slits pressure fluid at the same degree of pressure.

In casting the billet according to FIG. 23 the mold illustrated by FIGS. 34 to 36 may be employed, the graphite rods being positioned in the mold chamber to correspond to the positions occupied by them in the billet, as indicated in FIG. 39. As shown in FIG. 39, the upper end portions of the rods may be supported by the composite graphite plate shown by FIG. 39 consisting of the centrally positioned strip 155 the edges of which are provided with the notches 117 for slidably receiving the rods, these edges abutting the edges of strips 157 at opposite sides of the strip 155 for closing the notches, the strips 157 at their outer edges being provided with the longitudinally extending notches 159 which cooperate with the adjacent surfaces 77 of the mold chamber to form openings through which the molten metal may pass from above into the portion of the mold chamber below those strips. At the bottom of the mold chamber the lower end portions of the rods may be supported by graphite strips identical with the strips 155 and 157 except that the notches 159 are omitted and a slight clearance, similar to the clearance 131 of FIG. 35, is provided between the edges of the strips adjacent the rods for causing the strips to clamp against the rods when the mold chamber is closed preparatory to casting the billet.

If desired, the graphite rods 3 of one row of rods of the billet otherwise like that shown by FIG. 23 may be in staggered overlapping relation to the graphite rods of the other row to produce when the billet is rolled a strip, for example, having two rows of slits in which the slits of one row are in staggered overlapping relation to those of the other as indicated by the arrangement of slits 7 in the strip 161 (FIG. 26). The slits of the strip 161 may be expanded by use of a suitable die or form along the lines of those hereinbefore described to produce passages of desired cross-sectional shape, for example, the flattened passages 163 of FIG. 27 lying at opposite sides of the body of the strip. The graphite rods in the mold for casting the billet in this case may be supported in the way hereinbefore described in connection with the billet according to FIG. 23 and the rod support illustrated by FIG. 39 except that the notches 117 for receiving the rods of one row of rods will be in staggered overlapping relation to the notches 117 for receiving the rods of the other row of rods.

Similarly, the billet may be provided with three rows of the graphite rods to produce when the billet is rolled a strip, for example, having a plurality of banks of slits each consisting of three slits as indicated by the arrangement of slits 7 in the strip 165 of FIG. 31. Each bank of three slits may be expanded by introduction of pressure fluid into the slits to produce groups of passages of desired cross-section consisting of a central passage exemplified by the passage 167 of FIG. 32 and opposite outer passages exemplified by the passages 169 of said figure. Such expanding of the slits may be done, for example, by placing the strip in a suitable die or form along the lines of those hereinbefore described and introducing into the uppermost and lowermost slits only of each bank of slits of FIG. 31 pressure fluid at the same degree of pressure to produce the two outer passages 171 of FIG. 33, whereupon such pressure fluid may be exhausted and pressure fluid admitted into the remaining and central slit 7 of each bank of slits to expand that slit to form the central passage 167 of FIG. 32. The expansion of each bank of slits to produce passages of the cross-section shown by FIG. 32 may also be done by placing the strip in a die or form along the lines of that shown by FIGS. 13 to 15 but having grooves shaped to form, when pressure fluid is admitted into the central slit only of each bank of slits, the central passage 167 of the element indicated by FIG. 32, the element so produced being identical with that according to FIG. 7 except that the walls of each passage will consist of two layers separated by a slit corresponding to the uppermost and lowermost slits 7 of FIG. 31. Then each passage 167 thus formed may be filled with sand or the like and its ends plugged, whereupon the strip may be placed in the die or form according to FIGS. 13 to 15 and pressure fluid of the same degree of pressure be entered into said slits in the walls of each passage 167 to form the passages 169 of FIG. 32, the sand within said passage 167 preventing the walls defining that passage from collapsing under the force of such pressure fluid.

The billet for producing the strip according to FIG. 31 may be cast in the mold hereinbefore described, which mold in this case will be arranged with three rows of graphite rods 3, as indicated in FIG. 40, corresponding to the three rows of rods to be contained in the billet. These rods may be supported at their upper end portions by a composite graphite plate consisting of the edgewise abutting centrally positioned strips 173 and 175 and the two side strips 177, the edges of which latter abut the adjacent edges of the strips 173 and 175, respectively. As indicated in FIG. 40, the strip 173 is formed at its opposite edges with the notches 117, and the strip 175 at its lower edge as viewed in FIG. 40 with like notches, for receiving the rods of the several rows. As shown, the strips 177 at their outer edges are notched, as shown at 179, to form in conjunction with the surfaces 77 of the mold chamber passages for entering molten metal from above into the portion of the mold chamber below said strips. The portions of the rods at the bottom of the mold chamber may be supported by like strips 173, 175 and 177 except that the notches 179 of the strips 177 will be omitted and there will be a slight clearance similar to the clearance 131 of FIG. 35 between the abutting edges of the four strips so as to clamp those strips against the rods when the mold chamber is closed.

The strip according to FIGS. 3 and 4 may be passed through a slitter for dividing it into narrower strips 181 (FIG. 41) each having a single slit 7, the opposite edges of which slit are spaced from the opposite edges 183 of the narrower strip. The slits 7 in the strip according to FIGS. 3 and 4 may be spaced apart within limits at any desired distance to secure a spacing between the edges of the single slit and adjacent edges of the strip 181 as small or as great as may be desired. However, if the strip according to FIGS. 3 and 4 is to be divided to form the strips 181, the slits of the strip to be divided should not be spaced apart at such a small distance as will make the metal between the edges of the slit and the edges of the strip 181 liable to fail when the slit of the strip 181 is expanded, or create a liability of the line of severance produced by the slitter cutting into the slit by reason of possible waviness of the slit as it extends lengthwise of the strip. Ordinarily to insure securing under all conditions satisfactory results in these respects the spacing between the edges of the slit and the adjacent edges of the narrower strip 181 should not be less than about ⅛ inch.

The slit 7 of the strip 181 (FIG. 41) may be expanded to form tubes of various cross-sectional shapes. For example, by use of a die or form constructed according to FIGS. 13 to 15 it may be expanded to form the tube 185 illustrated by FIG. 42, that tube at diametrically opposite sides thereof having narrow bead-like wings 187, the outer edges 189 of such wings being positioned, if desired, as close as about ⅛ inch from the bore of the tube. Also, by use of a form or die along the lines of that shown by FIG. 17 the slits of the strip 181 may be expanded to form the tube 191 of semi-circular cross-section shown by FIG. 43 which at each of opposite sides thereof is provided with the bead-like wings 193.

The spacing between the adjacent edges of the slit 7 and edge 183 of the strip 181 of FIG. 41 may be such that when the slit is expanded to produce the tube the wings at the diametrically opposite sides of the tube will be wide enough to be folded or bent for augmenting the stiffness of the tube. For example, such spacing may be great enough to present at each of opposite sides of the slit sufficient material to be folded upon itself to provide a stiffening hem which will lie at diametrically opposite sides of the tube when the slit is expanded, as indicated by the hems 195 at opposite sides of the tube 197 shown by FIG. 45.

When the tube is to be attached to another surface the wings at opposite sides of the tube may be wide enough to form attaching flanges for the tube. For example, the wings may be widened to form the flanges 199 of the tube 201 of FIG. 46, and such flanges be provided with perforations 203 through which may be passed screws or other fasteners for attaching the tube to the surface of another part against which the flat bottom side 205 of the tube rests.

Similarly, the wings of the tube may be wide enough to provide sufficient metal to permit them to be bent to form the supporting flanges 208 of FIG. 47, which flanges have the downwardly bent portions 209 that at their lower portions are bent outward to form flange-like feet 211, these feet being provided with perforations 213 for passage of screws or other fasteners for securing them to a supporting surface.

The strip 181 of FIG. 41 may be bent transversely about an arc and then the metal at the convex side of the bend expanded, while the bent strip is positioned in a suitable die or form along the lines of those hereinbefore described, to form the curved tube 215 of FIG. 44.

The strip according to FIG. 41, which may be severed from a wider strip having a row of spaced slits 7, may be of such width, and the slit therein and the spacing of the edges of that slit from the edges of the strip such, as to enable the slit to be expanded, while the strip is in a suitable die or form, to produce the tube or conduit 217 according to FIG. 48. As shown, this tube has a flat bottom side 219, the wings 221 at opposite sides of the tube being provided with perforations 223 for screws or other fasteners for securing the tube to a flat supporting surface. As further shown, the metal below the slit 7, as viewed in FIG. 41, is expanded to an arcuate shape as viewed in cross-section to form a passage 225 the arcuate wall of which is provided with corrugations 227 extending longitudinally thereof for stiffening it. The slit may be so expanded by use of a die or form along the lines of that shown by FIG. 17 having the surfaces of its recesses or grooves 69 complementary in cross-section to the shape of the outer side of the corrugated wall of the passage 225 of FIG. 48. The wall forming the flat side of the passage 225 may, when desired, be say 3 or 4 inches wide to enable the tube to be used as a downspout for the roof gutters of a building, in which case the flat side of the tube may rest against the wall of the building and be secured thereto by fasteners extending through the perforations 223.

Similarly, the strip 181 of FIG. 41 and the slit 7 thereof may be of such widths as to permit the metal at opposite sides of the slit to be expanded to form the passage 229 of the tube or conduit 231 of FIG. 49, while the spacing between the edges of the slit and edges of the strip may be such as to provide metal of sufficient width to enable it to be bent to form the supporting flanges 233 at opposite sides of the passage. As shown in FIG. 49, these supporting flanges comprise the horizontal portions 235 and 237, the last mentioned being adapted to rest against a supporting surface and to be secured thereto by fasteners extending through perforations 239 formed in it, while connecting the adjacent edges of the portions 235 and 237 are shown downwardly and outwardly inclined webs 241. As illustrated, the upper and lower walls of the passage 229 are provided with longitudinally extending stiffening corrugations 243. The slit may be expanded by use of a suitable die or form constructed along the lines of that shown by FIGS. 13 to 15, the surfaces of the grooves of such die in cross-section being complementary to the outer surfaces of the corrugated walls of the passage 229. After the slit is so expanded the wings at opposite sides of the tube may be bent by use of forming rolls to form the flanges 233. The tube or conduit constructed according to FIG. 49, like that shown by FIG. 48, may also have its bore of sufficient size to permit it to be used as a downspout.

The strip 245 (FIG. 50), which may be formed by passing the strip 147 of FIG. 24 through a slitter, has a single pair of opposite slits 7 the edges of which, like the single slit of FIG. 41, are spaced from the opposite edges 247 of the strip. The slits of the strip 245 may be expanded to form a tube having superimposed passages of various cross-sectional shapes, for example, the passages 249 and 251 of the tube 253 shown by FIG. 51, the bottom surface of the strip not being expanded in this example so that the tube will have a flat bottom surface 255 adapted to rest on the flat surface of a part to which the tube may be secured.

To expand the slits of the strip according to FIG. 50 to produce the tube according to FIG. 51 the strip may be placed in a die or form identical with that shown by FIG. 17, whereupon pressure fluid may be introduced into the lowermost slit 7 only, as viewed in FIG. 50, to expand that slit to form the passage 249 of FIG. 51, which operation will produce a tube of the cross-sectional shape shown by FIG. 52. The tube according to FIG. 52 may then be removed from the die or form and the passage 249 thereof be filled with sand or the like and its ends plugged, whereupon the tube may be placed in a second die or form identical with the first mentioned except that the recesses or grooves 69 (FIG. 17) are higher to correspond to the upper side of the passage 251 of FIG. 51, and then pressure fluid may be admitted to the remaining and unexpanded slit 7 of FIG. 52 to expand that slit to produce the passage 251 of FIG. 51.

A strip similar to the strip 181 of FIG. 41 may have a bank of three superimposed slits 7, as shown by the strip 257 of FIG. 53, which strip may be produced by dividing the strip 165 of FIG. 31 by passing that strip through a slitter. The slits 7 of the strip according to FIG. 53 may be expanded to produce a tube having superimposed passages of various cross-sectional shapes, for example, the central passage 259 of FIG. 54 and the upper and lower passages 261 of that figure, or, if desired, those of the cross-sectional shapes indicated by FIG. 32. The slits of the strip 257 may be expanded to form the passages 259 and 261 in a manner similar to that above described in connection with FIGS. 50 to 52, the strip 257 being first placed in a suitable die or form and pressure fluid admitted to the central slit only of the strip to expand that slit to produce the passage 259 of FIG. 54, such operation producing a tube of the cross-sectional shape shown by FIG. 55. The tube according to FIG. 55 may then be removed from the die or form and the passage 259 of that tube be filled with sand or the like and its ends plugged. Such tube with the sand filled passage may then be placed in another die or form having grooves complementary to the outer surfaces of the outer walls of the passages 261 of FIG. 54, whereupon pressure fluid may be admitted to the upper and lower slits 7 to expand those slits to form the two passages 261 of FIG. 54, the sand in the passage 259 during this operation preventing collapse of the upper and lower walls of that passage.

Besides forming the various strips, tubular elements and tubes hereinbefore described of copper, other rollable cold workable metals may be employed such as aluminum and zinc, and various alloys such as brasses and bronzes of various compositions, Monel metal, cupronickel of various compositions, nickel-silver of various compositions, stainless steel of various compositions, carbon steel of various carbon content, and other alloys almost too numerous to mention. The most important metals for ordinary uses are copper, aluminum, zinc and 70:30 brass. These metals may be cast to form the billets, and the billets rolled, in accordance with usual commercial foundry and mill practices in respect to the particular metal involved.

It will be understood that elemental metals are not necessarily used commercially in their pure form for fabricating shapes such as strips but are often deliberately or otherwise alloyed with small amounts of other metals or metaloids. For example, what commercially is ordinarily termed "aluminum" in connection with fabricated shapes often is aluminum containing one or more of the substances manganese, magnesium and silicon, while what commercially is ordinarily termed "zinc" in connection with fabricated shapes commonly is zinc containing impurities such as lead and cadmium and in some instances also small amounts of iron, copper, tin, etc., and even as has heretofore been proposed may contain metals or metaloids deliberately added for improving its properties. It will therefore be understood that hereinafter and in the appended claims, where the context permits, by reference to an elemental metal, for example, "copper," "aluminum" and "zinc," are included, besides the substantially pure metal, alloys of which such metal constitutes the base constituent in the sense that copper constitutes the base constituent of what is termed in the art a "copper-base" alloy.

In respect to zinc and zinc-base alloys the present invention is of important significance. Seamless tubes or the like of zinc, and of zinc-base alloys of high zinc content, cannot be produced commercially by a drawing operation because zinc and such alloys when cold worked "self anneal" causing the tube to break under the force necessary to pull it through the drawing die. This property of zinc of self annealing however enhances the facility with which it may be reduced by a rolling operation, making it very suitable for use in producing the thin gauge strips according to the present invention. Furthermore, the self annealing of the zinc permits it readily to be expanded when pressure fluid is admitted into the slits of such strips. Likewise zinc, and zinc-base alloys of high zinc content, cannot be extruded to form thin walled tubes. Zinc tubes cannot be formed commercially by extrusion except with thick walls. Furthermore, it would be necessary in order to produce smooth walled tubes to subject such tubes after extrusion to a drawing operation which, as just explained, is commercially impractical because of the self-annealing property of zinc. Therefore, for some uses, zinc because of its relative inexpensiveness may constitute a desirable metal for substitution for other and more expensive metals for producing the seamless thin walled tubes according to the invention. Another advantage of zinc tubes over those formed of many other metals is that they more readily take paint, which may be of importance in architectural applications of the tubes, for example, with the downspouts hereinafter described in connection with FIGS. 48 and 49.

It has been found that in many instances the metal of the billet tends to be porous along its outer surfaces, such porosity extending into the body of the billet an appreciable distance. Best results are secured if the rods do not extend through this porous zone. Ordinarily so placing the rods in the billet that they are spaced from its side and edge surfaces not less than about ¾ inch will amply provide such spacing.

Graphite is preferably employed, where conditions permit its use, as the material of the rectangular rods hereinbefore described, because its machinability renders the rods capable of being readily and inexpensively fabricated, further because its low thermal expansion acts to insure against the rods warping when heated during the casting operation, and still further because the rods of such material are readily and quickly crushed during the rolling operation to form a body of fine weld preventing powder which effectively elongates with the billet so as to be extended continuously along the spaces in the billet occupied by the rods and along the slits formed by the flattening of such spaces as the billet is being elongated.

The graphite rods may be readily cut by use of a band saw or the like from graphite slabs of thickness equal to the widths of the rods to be produced. These slabs may be made in a known manner by mixing broken up anthracite coal, petroleum coke, or other suitable forms of carbonaceous material with a coal tar binder to form a mass which may be molded to the shape of the slabs. The molded slabs may then be placed in a so-called "graphitizing furnace" of known construction and heated to crack the organic constituents of the coal tar and drive off its volatiles whereby to produce slabs of hard carbon. By raising the temperature and prolonging the heat treatment the hard carbon is changed to graphite.

Preferably, after the rods are sawed or otherwise cut from the graphite slabs, and just prior to using them, they are heated in a furnace to a dull red heat for several hours to insure that they contain no moisture, absorbed or adsorbed gases, or volatiles, that might be liberated during the casting operation to form blow holes in the metal which might place spaces occupied by adjacent rods in communication or form gas cavities about the rods that would cause the slits in the sheet produced by rolling the billet to have ragged or irregular edges.

It has been found that the graphite of the rods will react with the cuprous oxide contained in so-called "tough pitch" copper, which is the form of copper usually employed for producing strip material, to liberate fairly large amounts of carbon dioxide or carbon monoxide from the molten copper in contact with the rods during the casting operation, these gases having the deleterious action described in the immediately preceding paragraphs. Consequently, when graphite rods are employed for producing copper billets according to the invention, deoxidized copper is preferably employed for avoiding the presence therein of cuprous oxide or other carbon reducible oxides. Such copper is preferably deoxidized by adding phosphorus to the melt, because residual amounts of phosphorus in the metal do not deleteriously affect the facility with which it may be rolled. Besides phosphorus the copper may be deoxidized with substances such as boron, calcium, calcium boride, and other deoxidizing agents, residual amounts of which in the metal do not make it difficult to roll. Ordinarily deoxidants such as silicon, titanium and the like are preferably not employed when the production of commercial copper is involved. Such constituents tend to alloy with the copper and even in small amount may substantially alter its characteristics. In these connections it will be understood that brass because of its high zinc content, and Phosphor bronze because of its phosphorus content, are deoxidized copper-base alloys and therefore are satisfactory for use with graphite rods, as is likewise, because of its silicon content, so-called "silicon copper," that is to say, copper containing silicon and small amounts of other elements, such as manganese, tin and zinc, for making it rollable and otherwise workable. Furthermore, graphite tends to dissolve in iron and nickel, and graphite rods are therefore preferably not employed when the billet is formed of a ferrous metal such as carbon steel or stainless steel or when the billet is formed of a nickeliferous metal, for example, Monel metal, cupro-nickel and nickel-silver. These considerations make it advisable to employ, as the material of the rods, substances other than graphite which are inert with respect to the molten metal if such metal is copper containing cuprous oxide or is a ferrous or a nickeliferous metal.

Many metals, notably zinc, and to a lesser extent aluminum, and to still lesser extent copper and brass, are anodic with respect to carbon, with the result that when the fluid conducted by the passages formed by the expanded slits of the rolled products according to the invention is of an acid nature there may be a tendency of the metal to corrode by galvanic action because of the residual graphite coating the walls of such passages. Such coatings, generally speaking, are not particularly objectionable with copper and brass, but are with zinc and aluminum. The coatings may however be removed from the passages by scouring their walls. Such scouring may be performed by forcing through the passages an abrasive slurry under pressure. Such slurry may consist of grease or soap, of soft consistency, mixed with an abrasive powder, such as powdered Carborundum, to form a thick pasty, or soft dough-like, mass. After the scouring operation is so performed the residual slurry in the passages may be removed by entering into them a suitable solvent, preferably a volatile solvent, for the soap or grease.

When it is desired to avoid necessity for the above mentioned scouring operation the rods, instead of being made of graphite, may be made of a material in respect to which the solidified metal is not anodic. At the same time such material for reasons above described is preferably chemically inert with respect to and insoluble in the molten metal and will not cause the evolution of gases or vapors during the casting operation. Preferably, when conditions permit its use, such other material is soapstone, which is naturally bonded talc particles, of a degree of machinability comparable to that of graphite, for permitting the soapstone rods to be sawed or otherwise cut from slabs of soapstone in the same way that the graphite rods may be sawed from slabs of graphite.

Further examples of such other rods are rods having as their basic constituents any of the substances talc, china clay, magnesia and alumina. These substances in powder form may be mixed with water and a suitable powdered binder, such as Portland cement of calcium aluminate, that will not deteriorate and lose its efficacy as a binder when subjected to high temperatures. These mixtures, like ordinary concrete, may be poured into molds and molded therein under pressure to form slabs, which latter after they "set" may be removed from the molds and permitted to air dry sufficiently to allow them to be handled and the rods to be sawed from them. When the rods are of non-rectangular cross-section, and if desired even when they are of rectangular cross-section, they may be directly molded under pressure from the mixture instead of first forming the slabs and sawing them from such slabs. However, it is quite feasible to form rods of nonrectangular cross-section from rectangular rods sawed from the slabs by appropriately machining such sawed rods, which is particularly true when the rods are cut in short lengths and strung on a wire or rod as hereinafter described in connection with FIGS. 56 to 61, in which case such short pieces will be subjected to the machining operation. These rods however produced may then be baked in a furnace at a moderate heat, say about 250° F. to drive off the moisture contained in them. The amount of binder need be no more than sufficient to hold the particles of the rod together so as to enable the rod to be readily handled and installed in the mold. The amount of binder is thus not critical, and applicant has found that anywhere from 5 to 30% Portland cement or calcium aluminate will suffice in this respect. Such rods, when the billet containing them is rolled, will, like graphite or soapstone, readily crush to form a fine weld preventing powder.

As a further example, these other rods may also be formed of mica ground in a pebble mill or the like with water to form a water suspension of mica particles. The water may be removed from the suspension by subjecting the mass to pressure, after which the resulting wet mass may be molded under pressure to form the rods and the rods then air dried and baked to remove the moisture as above described in connection with the rods having the binder. Alternately, the wet mass of mica particles may be molded under pressure into slabs which may be air dried and then baked to remove the moisture, and the rods sawed or otherwise cut from these slabs. These mica rods will crush during the rolling operation on the billet to form a fine weld preventing powder of mica.

Soapstone contains water of crystallization, which water tends to be driven off at high temperatures causing the soapstone to become too hard to permit the rods ordinarily to crush to a satisfactory weld preventing powder during the rolling operation. At the pouring temperatures of copper and brass, both of which are about 2200° F., such tendency is marked. Hence the soapstone rods cannot be employed for producing copper and brass billets and billets of other metals of comparable high pouring temperatures with assurance that, because of hardening of the rods and liberation therefrom of water vapors during the casting operation, the slits produced by the rolling operation will not have ragged and irregular edges and the walls of the slits if they lie close to a surface of such product will not be perforated by hard particles of relatively large size produced when the rods are so crushed. The above tendency of deterioration of the rods and liberation therefrom of water of crystallization is not marked at the pouring temperatures of zinc (about 850° F.) and aluminum (about 1250° F.), and therefore the soapstone rods are satisfactory for use with such metals and other metals of comparable low pouring temperatures. This also is true of the above described rods made of talc powder and a cementitious binder, because at the pouring temperatures of copper and brass water of crystallization is driven from the talc particles causing the rods to tend to liberate water vapors during the operation of casting the billet. Mica also contains water of crystallization which is driven off at the pouring temperatures of copper and brass, causing the above described rods made of mica to tend to deteriorate and liberate water vapors at such pouring temperatures, which will cause the same deleterious effects as just mentioned in connection with water vapors liberated from soapstone rods. The mica rods however do not markedly tend to deteriorate in this way at the pouring temperatures of zinc and aluminum, and other metals of comparable low pouring temperatures, and hence with such metals such rods may be employed with assurance that satisfactory results will be secured. The soapstone rods and those made of talc powder and a binder, and those made of mica particles, however, may be heated at moderate temperatures sufficient to drive off moisture and absorbed and adsorbed gases that may be contained therein without deterioration of such rods.

It has been found that best results are secured with rods of rectangular cross-section because, among other things, the widths of the slits when employing such rods will be substantially the widths of such rods, and such slits will have sharp regular edges. The amount of weld preventing powder produced in the spaces occupied by the rods is readily controlled by the thickness of the rods. By appropriate selection of such thickness the billet may be reduced by the rolling operation to produce, for example, strips of very small gauge without rupture of the metal at the faces of the slits. The thicknesses of these rectangular rods are in no way critical, as any excess weld preventing powder formed by crushing the rods will be forced from those ends of the spaces occupied by the rods which are advancing toward the rolls during the first few rolling passes as hereinbefore explained. For example, it has been found that a billet containing rectangular graphite rods from 0.4 to 1 inch wide, with thicknesses in each instance of width varying from ⅛ to ¼ inch, can be successfully rolled in this respect to produce strips as thin as 0.007 inch, which, except in connection with strips for use for fabricating automobile radiators and the like, is a much smaller gauge than ordinarily would be employed in commercial practice where the gauge seldom would be less than about 0.015 inch. In all these instances, and regardless of the thickness of the rods, the amount of graphite in the slits of the final rolled product produced is apparently the same. It will be understood that when the gauge of the rolled product to be produced is not too small, say not less than about 0.015 inch, the cross-sectional dimensions of the rods may be varied within very wide limits, for example, but without limitation thereto, rectangular rods have been successfully employed having cross-sections as follows: ¼ inch wide and ⅛ to ¼ inch thick, ½ inch wide and ⅛ to ½ inch thick, ¾ inch wide and ³⁄₁₆ to ½ inch thick, 1 inch wide and ³⁄₁₆ to ¾ inch thick, and 1½ inches wide and ¼ to 1 inch thick. Considered purely from a standpoint of securing satisfactory results in rolling the billet there is no limitation on the minimum thickness of the rod other than that imposed by the length of the rolled product to be produced.

However, for mechanical reasons, preferably the rods are not less than about ⅛ inch in thickness, as otherwise they become unduly fragile and increasingly difficult to fabricate, handle and install in the mold in which the billet is cast without their rupturing, and are liable to rupture during the pouring of the metal into the mold. With rods of this thickness much more than sufficient weld preventing powder will be formed than necessary to prevent welding of the opposite faces of the slits to each other in producing strips of any practical gauge from billets of any thickness employed in common commercial mill practice of rolling non-ferrous metals.

The widths of the rods also are not critical. However, it has been found that with rods more than about 1½ inches wide the metal at one or both faces of the slits in some instances tends to wrinkle and "laminate" when the slits lie close to a surface of the rolled product, say a distance appreciably less than 0.015 inch. Consequently when a slit is to be of relatively great width the distance the slit lies from a surface of the rolled product is preferably progressively increased with the width of the slit, so that when the slit is 3 or 4 inches wide and a strip, for example, is rolled from the billet best results will be secured when the gauge of the strip is not less than about 0.040 inch.

Also, for mechanical reasons, the widths of the rods are preferably kept down to a minimum, say to widths not exceeding about 2 inches, as otherwise the molten metal is liable not to flow properly about the rods and thus will act to cause a defective billet to be formed. When slits of greater widths than those of the rods are desired slits of such greater widths may be secured by "cross rolling" the billet, that is to say, rolling it in a direction transverse to the lengths of the rods, or, as another form of cross rolling, rolling it "diagonally," that is to say, at an angle to the lengths of the rods so as to have a component of reduction transverse to the direction of the lengths of the rods. Such cross rolling may be performed at any point during the reducing operation on the billet depending upon the lengths of the rolls of the mill available. For example, if it is desired to produce a rolled product according to the invention with slits 4 inches wide from a billet having rods 1½ inches wide, and the billet is 12 inches wide and 66 inches long, and the rolls available are about 36 inches long, such billet may be cut in halves intermediate its length to produce two billets each 33 inches long so that each may be accommodated by the 36 inch long rolls of the mill when they are passed through it to roll them in a direction transverse to the lengths of the rods. By rolling such 33 inch long billet in such direction to crush the rods and transversely elongate the billet 2.7 times, that is to say, elongate it from 12 to about 32.5 inches, the spaces occupied by the rods will be correspondingly transversely elongated to increase their widths from 1½ to 4 inches. The reduced billet 32.5 inches wide transversely of the rods will still be accommodated by the 36 inch long rolls when the billet is turned around and rolled lengthwise of the somewhat flattened spaces occupied by the rods. It will also be understood that the billet in the above example may be initially rolled in the direction of the lengths of the rods to reduce its thickness considerably, and then be severed transversely into lengths that will be accommodated by the rolls in rolling such lengths transversely in the direction of the lengths of the rods or the slits to widen such slits. For example, if the billet is 5 inches thick it may be first reduced by rolling it in the direction of the lengths of the rods to a thickness of 1 inch, which will elongate it to about 198 inches, and such 198 inch long billet may be divided transversely into six lengths each 33 inches long and be accommodated by the 36 inch long rolls so that they may be cross rolled for widening the spaces occupied by the rods or the slits formed by flattening such spaces, after which they may be rolled longitudinally of such spaces or slits to reduce them to the desired thickness. In these connections it will be understood that in the appended claims by "rolling the billet" or words of like import are included, where the context permits, rolling it in the length in which it is cast, and rolling lengths cut from it as cast or after it has been rolled partially to reduce it.

It will be understood that the rods need not necessarily be exactly of rectangular cross-section if they are molded to shape them as hereinbefore described. For example, they may be of the cross-sectional shape of the rod 265 shown by FIG. 19, which rod other than having the rounded edges 267 is of rectangular cross-section, or they may be of the cross-section of the rod 269 of FIG. 20, which cross-section is in the form of a flattened oval.

It is also possible to substitute for the rods of rectangular cross-section rods of circular cross-section, such as the rod 271 shown by FIG. 21. However, with rods of circular cross-section it has been found that if the diameter of the rod exceeds about ¼ inch there is a marked lack of assurance that as satisfactory results will be secured as with rods of rectangular cross-section.

In the first place, it has been found that when the rods are of circular cross-section the powder produced by crushing the rods tends, as the space occupied by the rod is flattened, to be pushed away from the edges of the slits being formed to cause the opposite faces of the slits adjacent such edges to weld together in places with the result that the slits produced tend in those places to be narrower than the diameter of the original space occupied by the rod, thus causing the edges of the slits to be ragged and irregular.

In the second place, with a solid rod of circular cross-section the amount of weld preventing material in the space occupied by the rod cannot be regulated as in a rectangular rod, with which latter the amount of such material can be varied by varying the thickness of the rod without varying its width, in which connection it will be observed that a round rod of say ½ inch diameter has more than three times as much weld preventing material as a ½ x ⅛ inch rectangular rod of the same length. This excess amount of weld preventing material presented by solid rods of circular cross-section is such that, because of the drastic change in cross-section of the spaces occupied by such rods in flattening such spaces, sufficient of it ordinarily will not be squeezed from those ends of the spaces occupied by the rods which advance toward the rolls before those spaces are so much flattened as to prevent such escape of material from them. This failure of escape of sufficient of the weld preventing material tends to prevent the rolled product even when the slits are of narrow width from being rolled down to as small a gauge as when the rods are of flat cross-section, because the metal at opposite faces of the slits when it is attempted to reduce the product to a small gauge, say for example one less than about 0.040 inch, tends to rupture particularly if the metal is relatively soft like copper, aluminum and zinc and the slits lie close to a surface of the product.

In the third place, for geometric reasons when the billet contains a plurality of rows of rods, for example, as in the billet according to FIG. 11, it is often impossible to place the rows close enough together to obtain a proper relation between the rows of slits in the product to be produced by rolling the billet.

The above described defect of too much weld preventing material being contained in solid rods of circular cross-section can be corrected by making them tubular instead of solid, for example as exemplified by the tubular rod 273 of FIG. 22. Such tubular rods, however, are difficult and expensive to produce particularly as their wall thicknesses must necessarily be thin. With the tubular round rods the slits may lie close to a surface of the rolled product without danger of the metal between the slits and such surface rupturing, but as the spaces occupied by such rods are still of circular cross-section there is, for reasons above explained, lack of assurance that the slits will not be of irregular width and have irregular and ragged edges.

In some instances savings may be effected by making the rods sectional as shown in the modified form of mold and rods according to FIGS. 56 to 61. This is particularly true, when the rods are of long lengths and are to be made of soapstone, because of the great waste of material in cutting such rods from irregular slabs furnished by the soapstone quarries.

As shown in FIGS. 56, 59 and 60, the sectional rods 275 are formed of relatively short sections or pieces 277 which are drilled lengthwise and strung in endwise abutting relation on supporting rods or wires 279. Preferably, but not necessarily, each of the pieces 277, except the lowermost piece which has a plain end 280, at one end is mortised as indicated at 281 (FIG. 59), and at its opposite end is formed with a tongue 283 which accurately fits the like mortise of an adjacent piece, in this way to insure that the outer edges 285 of each piece will be accurately aligned with the outer edges of the adjacent pieces when such pieces are strung on the supporting rods. These pieces are readily formed of natural soapstone which may be worked with great precision by woodworking tools and even more readily than can wood. Graphite also can be readily worked to form the pieces, and likewise can the other rods hereinbefore described although commonly with less facility than soapstone and graphite.

The supporting rods or wires 279 preferably are relatively stiff. They may be smooth hard drawn heat resistant metal, such as stainless steel. Although their diameters are in no way critical, such rods are preferably of as large diameter as the cross-sectional dimensions of the sectional rods will permit and in any ordinary case not less than 1/16 inch diameter. Preferably the sections or pieces 277, when of non-circular cross-section, are strung on two supporting rods better to insure that such pieces are held in alignment with each other. When the slits to be formed by rolling the billet are less than about ¼ to 5/16 inch wide the sectional rods may be of circular cross-section and the pieces comprising each rod strung on a single supporting rod or wire.

As shown, for supporting the rods or wires 279 and the sectional core rods strung on them, there is positioned at the bottom of the vertical mold chamber a plate 287 (FIG. 56) which may be formed of heat refractory material such as soapstone, graphite, or stainless steel, this plate resting on the upper surface of the bottom water cooled casting 93 of the mold. The plate 287 is of such width, that when the vertical side of the mold is closed by the side plate 85 and adjacent water cooled side casting 89 of the mold, said plate 287 will be clamped between the plate 85 and opposite side plate 83 of the mold. Such clamping of the plate 287 prevents any possibility of its floating upward when the mold is being poured.

As shown, the plate 287 at its under side is formed with a longitudinally extending groove 291 and with through perforations 293 opening into said groove, through which perforations extend the supporting rods or wires 279. At their lower ends these rods carry washers 295 through which extend said ends, and to which ends the washers are fixedly secured by weld metal as indicated at 297 (FIG. 59).

At their upper ends the supporting rods or wires 279 slidably extend through vertical perforations 299 formed in a bar 301 of heat refractory material, such as graphite, soapstone and stainless steel, which bar extends across the upper end of the mold chamber above the upper level L of the molten metal poured into such chamber, the sliding fit in the bar of such rods permitting linear expansion of them when the metal is poured. As shown, the bar 301 is received at its opposite ends in notches 303 formed in the upper edges of the water cooled edge castings 91 of the mold, the bar having at each of its opposite ends on its under side a transversely extending lug 305 which abuts the adjacent inner side of the adjacent casting 91 to prevent endwise movement of the bar relative to the mold chamber.

Floating of the sections or pieces 277 of the sectional rods upward when the mold is being poured is shown as prevented by removable clamping members 307 (FIGS. 56 and 61) removably secured to the supporting rods or wires 279. As illustrated, each of these clamping members comprises a pair of small metal plates 309 and 311 lying at opposite sides, respectively, of the associated supporting rods, the plate 309 being formed with a screw-threaded perforation 313 and the plate 311 with an aligned perforation 315, through which latter extends the shank of a screw 317 screw-threaded into the perforation 313. In an obvious manner the clamping member may be secured to its associated supporting rods by tightening the screw 317, and, by backing off the screw, may be released from those rods and slid upward off them after removal from the mold of the bar 301.

The sectional rods 275 may be conveniently assembled, by use of a suitable fixture, on their supporting rods or wires 279 and with the plate 287 when those parts are outside the mold chamber. In this way the supporting rods having the washers 295 welded thereto may be passed through the perforations 293 in the plate, after which the pieces or sections 277 may be threaded on the supporting rods. After this is done the clamping members 307 may be placed on the supporting rods and those rods pulled longitudinally from their upper ends to cause the washers 295 to bear against what is the upper surface of the groove 291 when viewed in FIG. 56, and at the same time the clamping members be slid downward against the ends of the last sections or pieces 277 threaded on the supporting rods and the clamping members tightened. The parts may then be removed from the fixture after placing on those end portions of the supporting rods which extend beyond the clamping members a wooden or other light weight member, corresponding to the bar 301, for steadying the assembled sectional rods and holding them in proper spaced relation. The plate 287 with the assembled rods may then be slid into the mold chamber, whereupon the bar 301 may be placed in position with the upper ends of the supporting rods extending through the perforations therein. The wooden bar, which is so positioned on the supporting rods as to lie below the bar 301 when the latter is placed in position, may then be removed, and for that purpose it is preferably split longitudinally into two halves in the plane of the row of supporting rods and those halves secured together by wood screws which may be removed after the bar 301 is placed in position. The side of the mold may then be closed by replacing the plate 85 and adjacent water cooled casting 89, and the metal poured to cast the billet. After the billet has cooled, the plate 85 and casting 89 may be removed again to open the side of the mold, and the billet together with the plate 287 be slid from the mold chamber after removal of the bar 301. Upon loosening the clamping members 307 from the supporting rods such rods may then be removed from the sectional rods 275 by pulling on such supporting rods at their ends having the washers 295, such pulling on the rods preferably being done by pulling the plate 287 away from the billet.

Preferably, after the sections or pieces of the sectional rods 275 are strung on their supporting rods or wires 279, and the clamping members 307 are secured in place, the sectional rods are given a thin coating of suitable paint to fill and seal any cracks that may exist between the abutting ends of such sections. This paint may be that, commonly employed for dressing the surfaces of the mold chambers of metal molds, consisting of bone ash mixed with sufficient water glass to give a paint of rather thick consistency, or may be talc powder or powdered magnesia, china clay, bauxite, alumina or the like, mixed with sufficient water glass, or with sufficient water and Portland cement or powdered calcium aluminate, to give a paint of rather thick consistency. After the paint is applied it may be allowed to air dry before casting the billet.

It will be understood that within the scope of the appended claims wide deviations may be made from the forms of the invention herein described without departing from the spirit of the invention.

I claim:

1. The method of making through the medium of cast billets thin gauge flat-faced strips of one of the non-ferrous malleable metals selected from the group consisting of copper, aluminum, and zinc in lengths including great lengths up to hundreds of feet and having throughout the lengths internal longitudinal parallel slits inflatable to form smooth-walled tubular passages in the metal strip, which method comprises preparing elongate rod-like smooth-surfaced members of pulverulent material selected for the particular casting metal and of flattened transverse cross-section such as rectangular with major and minor cross-sectional axes uniform throughout the member lengths and which material of said rod-like members at the pouring and the rolling temperatures of the particular said metal is stable and is chemically and physically substantially inert with respect to said metal and which members when a billet containing them is subjected to longitudinal rolling are in the entirety capable of being crushed to fine weld-preventing powder incapable of marring the metal during such rolling, presenting a row of said rod-like members longitudinally vertically and in mutual parallelism at a walled casting formation having wall areas for defining an elongate billet to have substantially rectangular and uniform cross-section and opposite parallel flat faces and opposite longitudinally straight side edges and in so presenting said rod-like members disposing them with their said major cross-sectional axes parallel to said billet-face-defining areas of the casting formation and with said members substantially spaced from said areas and from each other and from the billet-side-edge-defining areas of said formation in such wise as to form in the product metal strip slits for ultimate inflation to tubular passages of the desired spacing and cross-sectional size and shape, casting the particular said metal directly about and in contact with each of said so-presented rod-like members to form such described elongate billet containing them, flat rolling such billet longitudinally for decreasing its thickness between said faces thereof and for elongating it in the direction of the lengths of such rod-like members and for moving opposite billet-face-paralleling surfaces of the spaces defined by such members toward each other and for crushing such members to form said fine and non-marring weld-preventing powder and for distributing such powder along said spaces by and during the rolling for preventing welding together of said surfaces while the billet is being so rolled, and continuing such rolling until said opposite surfaces of said spaces are brought into non-adhering substantially contacting relation thereby to form longitudinal slits and until the billet is reduced to form said flat-faced thin gauge metal strip containing said slits with the powder distributed as an extremely attenuated layer therealong and which slits are capable of being inflated by introduction thereinto of pressure fluid to provide the selectively spaced continuous smooth-walled longitudinal passages in the strip.

2. The method according to claim 1 wherein the pulverulent material of the elongate rod-like members is selected from the group consisting of graphite, soapstone, bonded powderous talc and bonded ground mica.

3. The method according to claim 1 wherein the casting metal of the billet is copper and the rod-like members are of graphite.

4. The method according to claim 1 wherein the casting metal of the billet is one of the metals aluminum and zinc and the rod-like members are of a material selected from the group consisting of soapstone, bonded talc and bonded ground mica.

(References on following page)

References Cited in the file of this patent

UNITED STATES PATENTS

| | | | |
|---|---|---|---|
| 29,276 | Holmes | July 24, | 1860 |
| 377,316 | Marshall | Jan. 31, | 1888 |
| 377,317 | Marshall | Jan. 31, | 1888 |
| 377,318 | Marshall | Jan. 31, | 1888 |
| 1,723,659 | Rosenqvist | Aug. 6, | 1929 |
| 1,761,281 | Taub | June 3, | 1930 |
| 1,807,796 | Reid | June 2, | 1931 |
| 2,662,273 | Long | Dec. 15, | 1953 |
| 2,690,002 | Grenell | Sept. 28, | 1954 |
| 2,728,124 | Sofield | Dec. 27, | 1955 |
| 2,740,188 | Simmons | Apr. 3, | 1956 |
| 2,743,495 | Eklund | May 1, | 1956 |
| 2,766,514 | Adams | Oct. 16, | 1956 |
| 2,922,344 | Meissner | Jan. 26, | 1960 |

FOREIGN PATENTS

| | | | |
|---|---|---|---|
| 1,467 | Great Britain | Jan. 31, | 1888 |
| 401,476 | Germany | Sept. 8, | 1924 |